US010855622B2

(12) United States Patent
Subbiah et al.

(10) Patent No.: US 10,855,622 B2
(45) Date of Patent: *Dec. 1, 2020

(54) FIBRE CHANNEL FORWARDER DEVICE LOCAL ROUTING SYSTEM

(71) Applicant: Dell Products L.P., Round Rock, TX (US)

(72) Inventors: Ramesh Kumar Subbiah, Tamil Nadu (IN); Vibin Varghese, Tamil Nadu (IN)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/259,256

(22) Filed: Jan. 28, 2019

(65) Prior Publication Data
US 2020/0244598 A1 Jul. 30, 2020

(51) Int. Cl.
H04L 12/931 (2013.01)
H04L 12/771 (2013.01)
H04L 12/721 (2013.01)
H04L 12/725 (2013.01)

(52) U.S. Cl.
CPC ......... H04L 49/357 (2013.01); H04L 45/304 (2013.01); H04L 45/56 (2013.01); H04L 45/72 (2013.01); H04L 49/70 (2013.01); H04L 45/26 (2013.01)

(58) Field of Classification Search
CPC ..... H04L 49/357; H04L 45/304; H04L 45/56; H04L 45/72; H04L 49/70
See application file for complete search history.

(56) References Cited

U.S. PATENT DOCUMENTS

2008/0025322 A1* 1/2008 Tadimeti ................ H04L 41/08
370/400
2013/0148659 A1* 6/2013 Shukla ................ H04L 61/2038
370/390

* cited by examiner

Primary Examiner — Yemane Mesfin
Assistant Examiner — Henry Baron
(74) Attorney, Agent, or Firm — Haynes and Boone, LLP

(57) ABSTRACT

A Fibre Channel Forwarder (FCF) routing system includes an FCF device that is coupled to a FC networking device through a first FCF device port, an initiator device through a second FCF device port; and a target device through a third FCF device port. The FCF device receives, at the second FCF device port, traffic that originates from the first initiator device and that is addressed to the first target device. The FCF device determines, using an FCF device association table that identifies zones provided by the FC networking device, that the target device is associated with the initiator device. The FCF device then routes, in response to determining the target device is associated with the initiator device, the traffic through the third FCF device port to the target device without forwarding the traffic through the first FCF device port to the FC networking device.

17 Claims, 16 Drawing Sheets

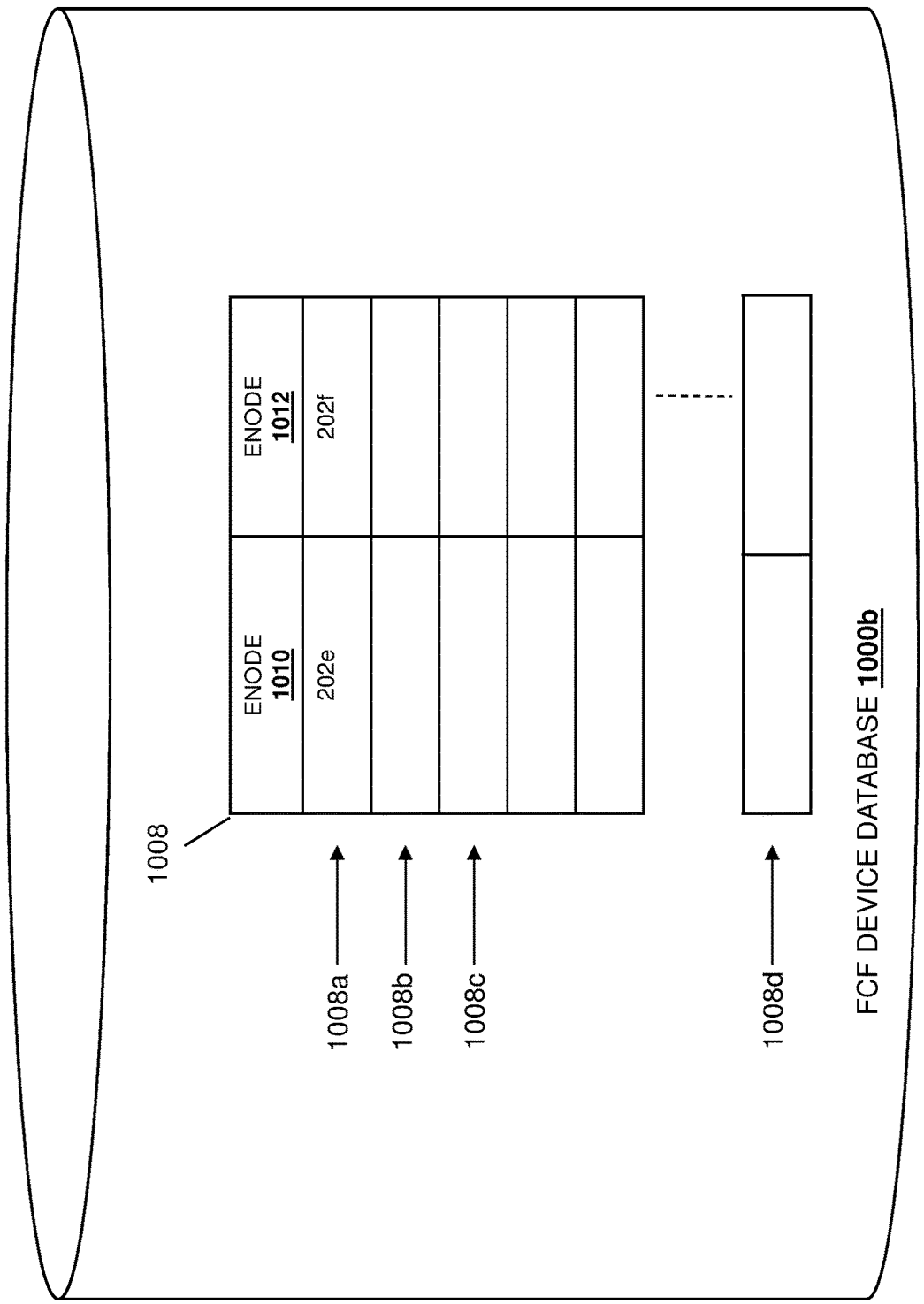

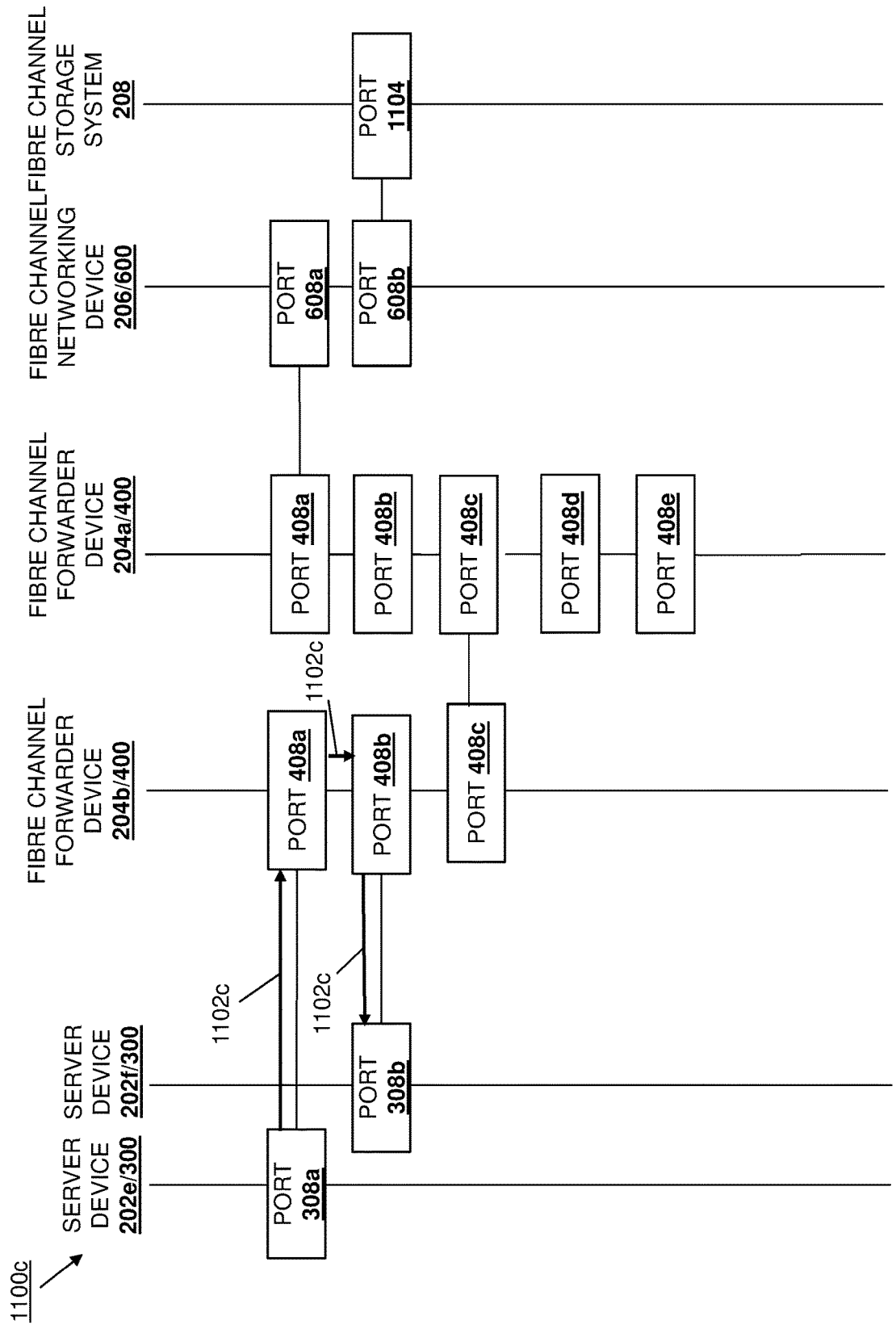

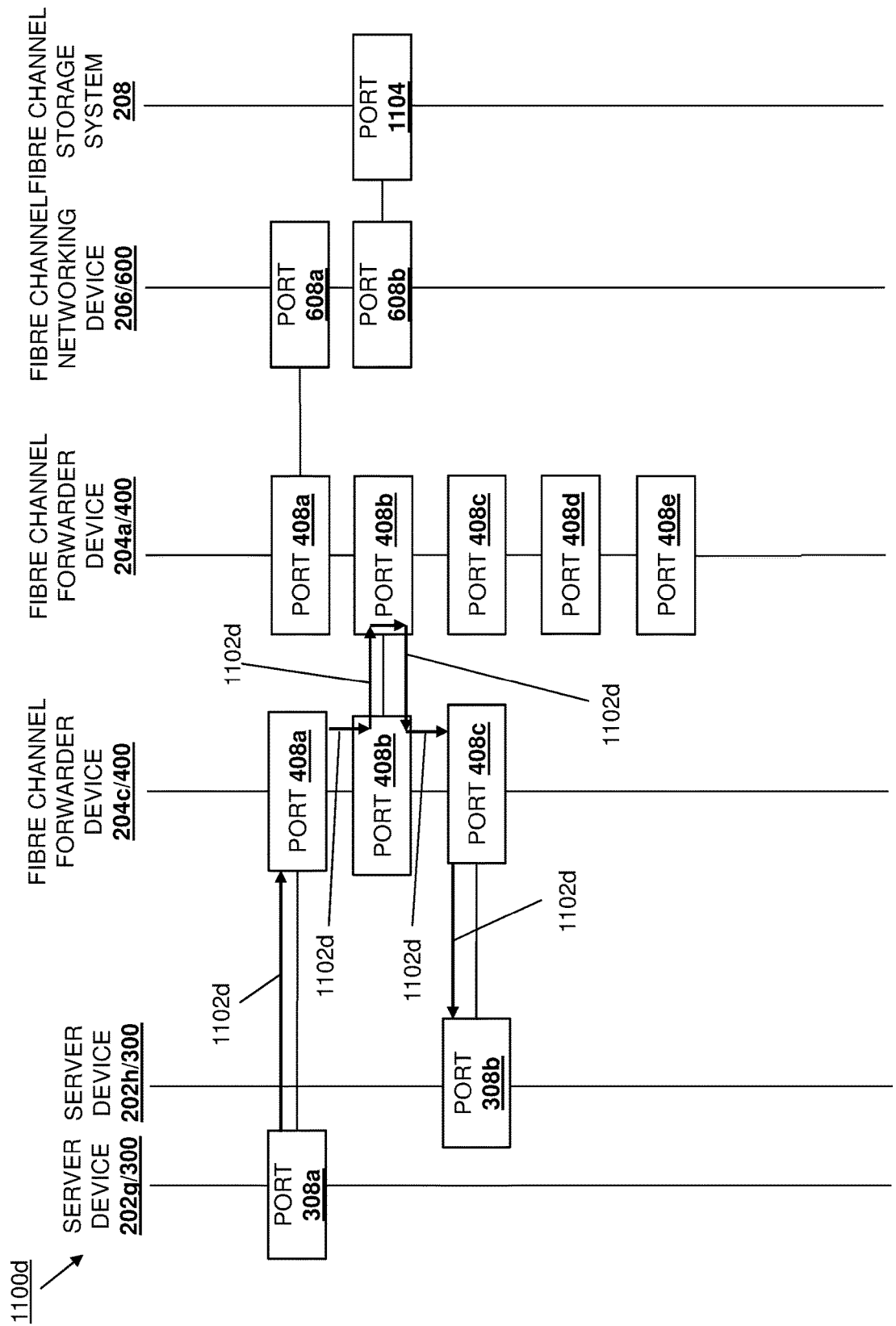

FIBRE CHANNEL FORWARDER DEVICE LOCAL ROUTING SYSTEM

BACKGROUND

The present disclosure relates generally to information handling systems, and more particularly to locally routing Fibre Channel Forwarder (FCF) traffic by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are configured to provide a Fibre Channel (FC) Storage Area Network (SAN) for the storage of data. In such systems, an FC switch device may be utilized to couple the FC SAN to server devices via a Fibre Channel Forwarder (FCF) device that performs FC over Ethernet (FCoE)-to-FC protocol conversions on Ethernet communications sent from the server devices to the FC SAN, as well as FC-to-FCoE protocol conversions on FC communications sent from the FC SAN to the server devices. Such FCF devices allow server devices that communicate via the Ethernet protocol to utilize FC SANs that communicate via the FC protocol. However, the conventional functionality of such FCF devices raises a number of issues.

For example, servers in such systems may utilize a Converged Network Adapter (CNA) to communicate with an N_Port ID Virtualization (NPIV) Proxy Gateway (NPG) provided by the FCF device in order to provide login communication for logging into the FC SAN, with the FCF device converting those login communications and the NPG providing them to the FC switch device in order to log the server device into the FC SAN. After logging server devices into the FC SAN, the FCF device may forward traffic from those server devices to the FC switch device. The FC switch device may then route the traffic to the FC SAN using Fibre Channel identifiers (FCIDs) that are included in the traffic and that were assigned to the node ports (N_Ports) on the server devices and the FCF device during fabric login. In conventional systems, all traffic received at the FCF device is required to be routed by the FC switch device. Thus, when a server device provides traffic to the FCF device that is destined for a target device that is also connected to the FCF device, the traffic is first forwarded to the FC switch device to perform the routing discussed above that provides that traffic back through the FCF device to the target device. This creates a "traffic tromboning" effect which can cause a number of issues such as inefficient traffic paths that introduce latency with the traffic, congestion between the FCF device and the FC switch device, and other undesirable traffic characteristics that would be apparent to one of skill in the art.

Accordingly, it would be desirable to provide an improved FCF device routing system.

SUMMARY

According to one embodiment, an Information Handling System (IHS), includes a plurality of ports; a processing system that is coupled to the plurality of ports; and a memory system that is coupled to the processing system and that includes instructions that, when executed by the processing system, cause the processing system to provide an N_Port ID Virtualization (NPIV) Proxy Gateway (NPG) engine that is configured to: receive, at a first port of the plurality of ports, first traffic that originates from a first initiator device and that is addressed to a first target device; determine, using a first Fibre Channel Forwarder (FCF) device association table that identifies zones provided by a Fibre Channel (FC) networking device, that the first target device is associated with the first initiator device; and route, in response to determining the first target device is associated with the first initiator device, the first traffic through a second port to the first target device without forwarding the first traffic through a third port to the FC networking device.

BRIEF DESCRIPTION OF THE DRAWINGS

FIG. 10C is a schematic view illustrating an embodiment of information being provided in the FCF device database of FIG. 5 for a second FCF device during the method of FIG. 8.

FIG. 11C is a diagram illustrating an embodiment of the FCF device local routing during the method of FIG. 8.

FIG. 11D is a diagram illustrating an embodiment of the FCF device local routing during the method of FIG. 8.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
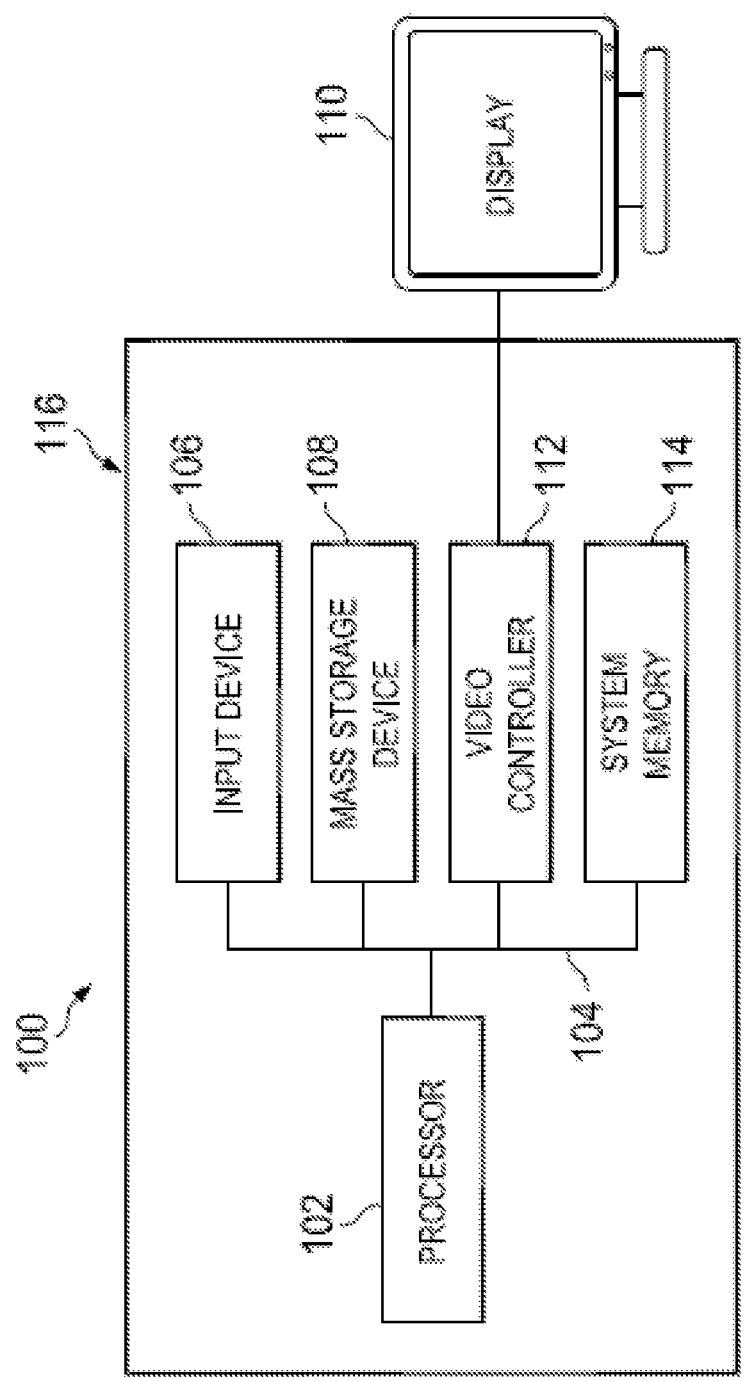
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
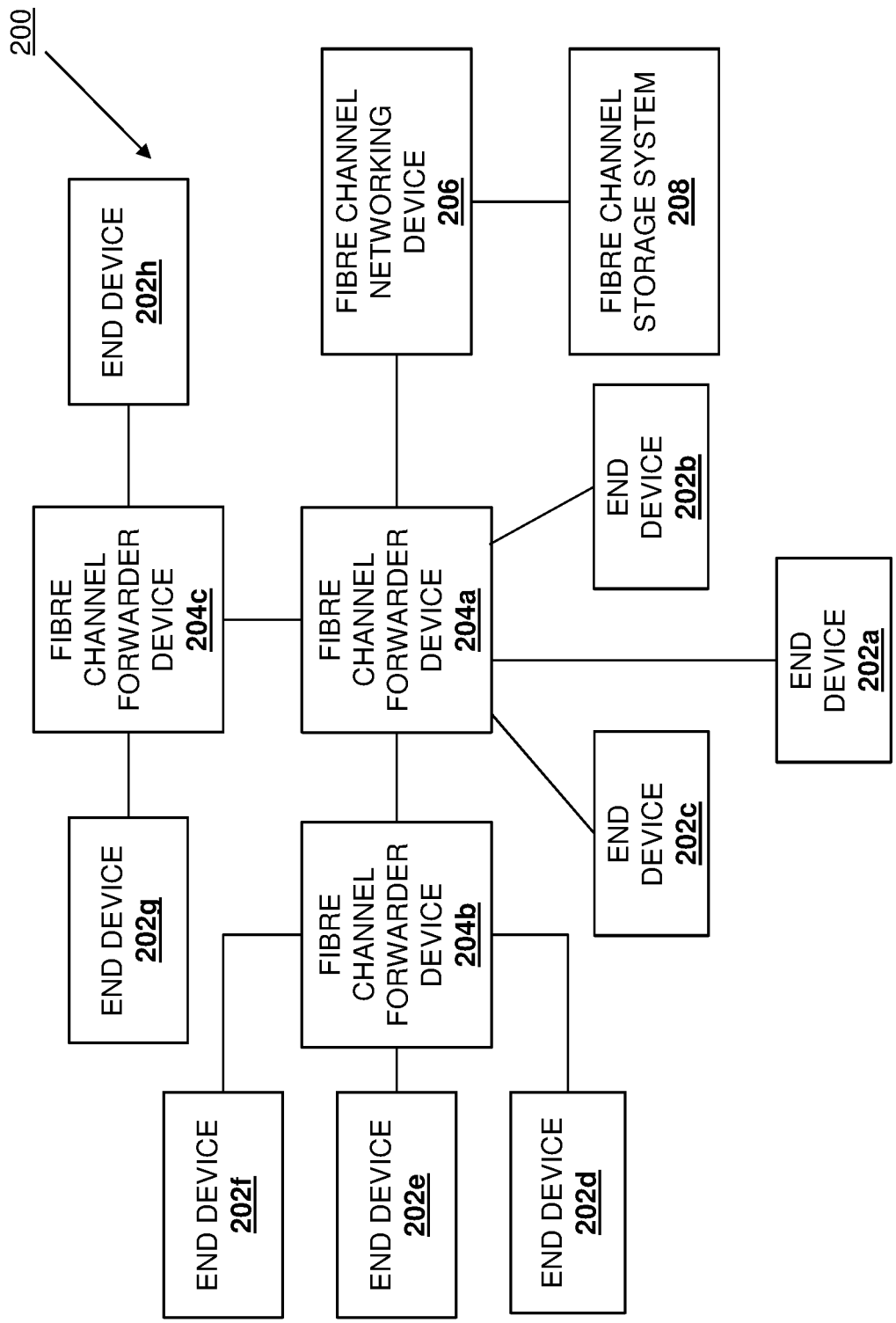
FIG. 2 is a schematic view illustrating an embodiment of a Fibre Channel Forwarder (FCF) device local routing system.

Referring now to FIG. 2, an embodiment of a Fibre Channel Forwarder (FCF) device local routing system 200 is illustrated. In the illustrated embodiment, the FCF device local routing system 200 includes one or more end devices (e.g., an end device 202a, an end device 202b, an end device 202c, an end device 202d, an end device 202e, an end device 202f, an end device 202g, and up to an end device 202h illustrated in FIG. 2), any or all of which may be provided by the IHS 100 discussed above with reference to FIG. 1 and/or may include some or all of the components of the IHS 100. As described herein, end devices may be also referred to as enodes and each end device may be initiators, targets, and/or both initiators and targets. For example, the end devices 202a-202h may be one or more servers (e.g., an initiator) in a server rack or server chassis, a Fibre Channel (FC) storage system (e.g., a target), and one of skill in the art in possession of the present disclosure will recognize that any number of servers or storage systems may be provided in the FCF device local routing system 200 and may operate similarly to the server devices and storage systems discussed below while remaining within the scope of the present disclosure. In the illustrated embodiment, the end devices 202a-202c are coupled to a Fibre Channel Forwarder (FCF) device 204a that may be provided by the IHS 100 discussed above with reference to FIG. 1 and/or may include some or all of the components of the IHS 100. For example, the FCF device 204a may be provided by a switch or other networking device that is configured to receive Ethernet communications from the end devices 202a, 202b, and/or 202c, convert those Ethernet communications to Fibre Chanel (FC) communications for forwarding to an FC Storage Area Network (SAN), receive FC communications from the FC SAN, convert those FC communications to Ethernet communications for forwarding to the end devices 202a, 202b, and/or 202c, and/or perform other FCF device functionality know in the art.

In the illustrated embodiment, the FCF device 204a is coupled to an FC networking device 206 that may be provided by the IHS 100 discussed above with reference to FIG. 1 and/or may include some or all of the components of the IHS 100. For example, the FC networking device 206 may be provided by a FC switch device that is configured to receive FC communications (e.g., initiated by the end device 202a) from the FCF device 204a, log the end devices 202a-202c into an FC SAN, subsequently receive FC communications (e.g., initiated by the end devices 202a-202c) from the FCF device 204a, transmit those FC communications to the FC SAN to allow the end devices 202a-202c to communicate with the FC SAN, and perform a variety of other FC networking device functionality that would be apparent to one of skill in the art in possession of the present disclosure. In the illustrated embodiment, the FC networking device 206 is coupled to an FC storage system 208 that may be provided by one or more of the IHSs 100 discussed above with reference to FIG. 1 and/or may include some or all of the components of the IHS 100. For example, the FC storage system 208 may be provided by a FC SAN that is configured to receive FC communications from the end devices 202a-202c through the FC networking device 206 and the FCF device 204a, send FC communications to the end devices 202a-202c through the FC networking device 206 and the FCF device 204a, and/or perform a variety of other FC storage system functionality that would be apparent to one of skill in the art in possession of the present disclosure.

In addition, the FCF device 204a is coupled to an FCF device 204b that is "downstream" from the FCF device 204a (e.g., opposite the FCF device 204a from the FC storage system 208), as well as to the end devices 202*d*-202*f*. Furthermore, the FCF device 204*a* is coupled to an FCF device 204*c* that is downstream from the FCF device 204*a*, as well as to the end devices 202*g* and 202*h*. One of skill in the art in possession of the present disclosure will recognize that other FCF devices and end devices may be coupled to, and located downstream from, the FCF devices 204*a*, 204*b*, and/or 204*c* illustrated in FIG. 2 in order to provide a "cascade" of FCF devices from the FCF device 204*a*. However, while a specific FCF device routing system 200 is illustrated and described below, one of skill in the art in possession of the present disclosure will recognize that the teachings of the present disclosure will be beneficial for a variety of FC systems and, as such, a wide variety of modifications to the number, types, and configuration of devices in the FCF device local routing system 200 will fall within the scope of the present disclosure as well.

Figure 3:
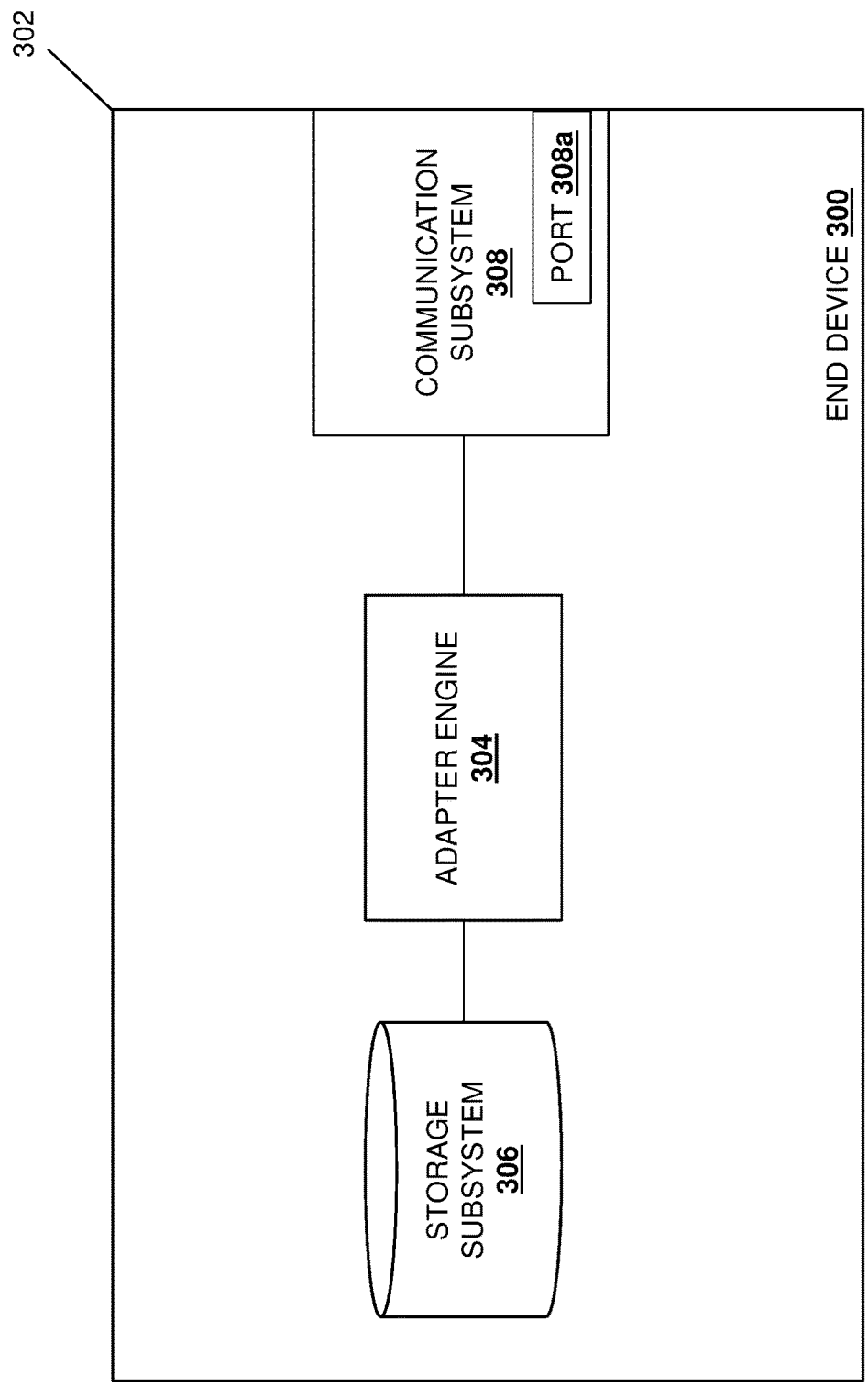
FIG. 3 is a schematic view illustrating an embodiment of an end device in the FCF device local routing system of FIG. 2.

Referring now to FIG. 3, an embodiment of an end device 300 is illustrated that may be any or all of the end devices 202*a-h* discussed above with reference to FIG. 2. As such, the end device 300 may be provided by the IHS 100 discussed above with reference to FIG. 1 and/or may include some or all of the components of the IHS 100, and in specific examples may provide one or more servers in a server rack or server chassis and/or a storage device in a storage system rack or storage system chassis. In the illustrated embodiment, the end device 300 includes a chassis 302 that houses the components of the end device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an adapter engine 304 that is configured to perform the functions of the adapter engines and end devices discussed below.

The chassis 302 may also house a storage system 306 that is coupled to the adapter engine 304 (e.g., via a coupling between the storage system 306 and the processing system) and may be configured to store the data utilized by the adapter engine 304 as discussed below. However, in some embodiments the storage subsystem 306 may be omitted. The chassis 302 may also house a communication subsystem 308 that is coupled to the adapter engine 304 (e.g., via a coupling between the communication subsystem 308 and the processing system) and that may include a Network Interface Controller (NIC), a wireless communication device, one or more ports (e.g., the port 308*a* illustrated in FIG. 3), and/or any other communication components that would be apparent to one of skill in the art in possession of the present disclosure. Furthermore, in some embodiments, the adapter engine 304, the communication subsystem 308, and/or other components in the end device 300 may provide a Converged Network Adapter (CNA) that performs the functionality of the adapter engines and/or end devices discussed below. However, in other embodiments, the adapter engine 304, communication subsystem 308, and/or other components may be utilized to provide other types of adapters (e.g., Host Bus Adapters (HBAs)) while remaining within the scope of the present disclosure. While a specific end device 300 has been described, one of skill in the art in possession of the present disclosure will recognize that the end device 300 may include a variety of other components and/or component configurations that perform conventional server device functionality and/or storage system functionally, as well as the functionality described below, while remaining within the scope of the present disclosure.

Figure 4:
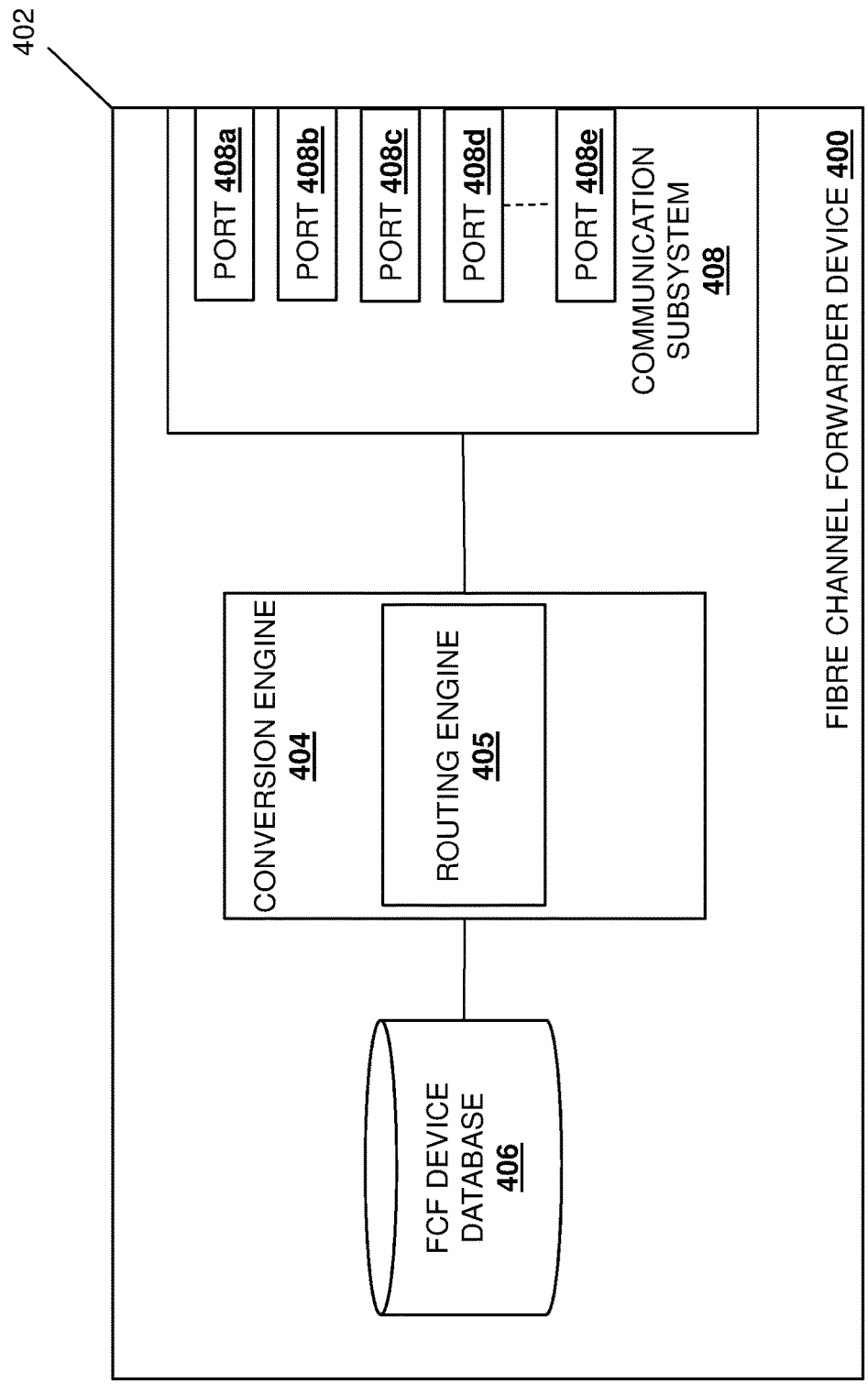
FIG. 4 is a schematic view illustrating an embodiment of an FCF device in the FCF device local routing system of FIG. 2.

Referring now to FIG. 4, an embodiment of a Fibre Channel Forwarder (FCF) device 400 is illustrated that may provide any or all of the FCF devices 204*a-c* discussed above with reference to FIG. 2. As such, the FCF device 400 may be provided by the IHS 100 discussed above with reference to FIG. 1 and/or may include some or all of the components of the IHS 100, and in specific examples may be a switch device, a gateway device, or other networking devices that would be apparent to one of skill in the art in possession of the present disclosure. In the illustrated embodiment, the FCF device 400 includes a chassis 402 that houses the components of the FCF device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a conversion engine 404 that is configured to perform the functions of the conversion engines and FCF devices discussed below. In a specific example, the conversion engine 404 may include an N_Port ID Virtualization (NPIV) Proxy Gateway (NPG) engine that operates as discussed below, although other conversion engines may fall within the scope of the present disclosure as well. In another example, the conversion engine 404 may include a routing engine 405 that is configured to perform the functions of the routing engines and FCF devices discussed below (e.g., the local routing of traffic between devices that are coupled to the FCF device without the traffic passing through an FC networking device).

The chassis 402 may also house a storage system (not illustrated, but which may include the storage device 108 discussed above with reference to FIG. 1) that is coupled to the conversion engine 404 (e.g., via a coupling between the storage system and the processing system) and that may include an FCF device database 406 that is configured to store the data utilized by the conversion engine 404 and/or routing engine 405 as discussed below. The chassis 402 may also house a communication subsystem 408 that is coupled to the conversion engine 404 (e.g., via a coupling between the communication subsystem 408 and the processing system) and that may include a Network Interface Controller (NIC), a Fibre Channel interface, a wireless communication device, ports, and/or other communication components that would be apparent to one of skill in the art in possession of the present disclosure. For example, in the illustrated embodiment, the communication subsystem 408 includes a plurality of ports (e.g., the ports 408*a*, 408*b*, 408*c*, 408*d*, and up to 408*e* illustrated in FIG. 4) that may be coupled to an FC networking device, another FCF device, and/or a end device as discussed below. Furthermore, in some embodiments, the conversion engine 404, the communication subsystem 408, and/or other components of the FCF device 400 may provide an NPG that performs the functionality of the conversion engines and/or FCF devices discussed below. However, as discussed above, the conversion engine 404 may be utilized to provide for other types of conversions while remaining within the scope of the present disclosure. While a specific FCF device 400 has been described, one of skill in the art in possession of the present disclosure will recognize that the FCF device 400 may include a variety of other components and/or component configurations that perform conventional FCF device functionality, as well as the functionality described below, while remaining within the scope of the present disclosure.

Figure 5:
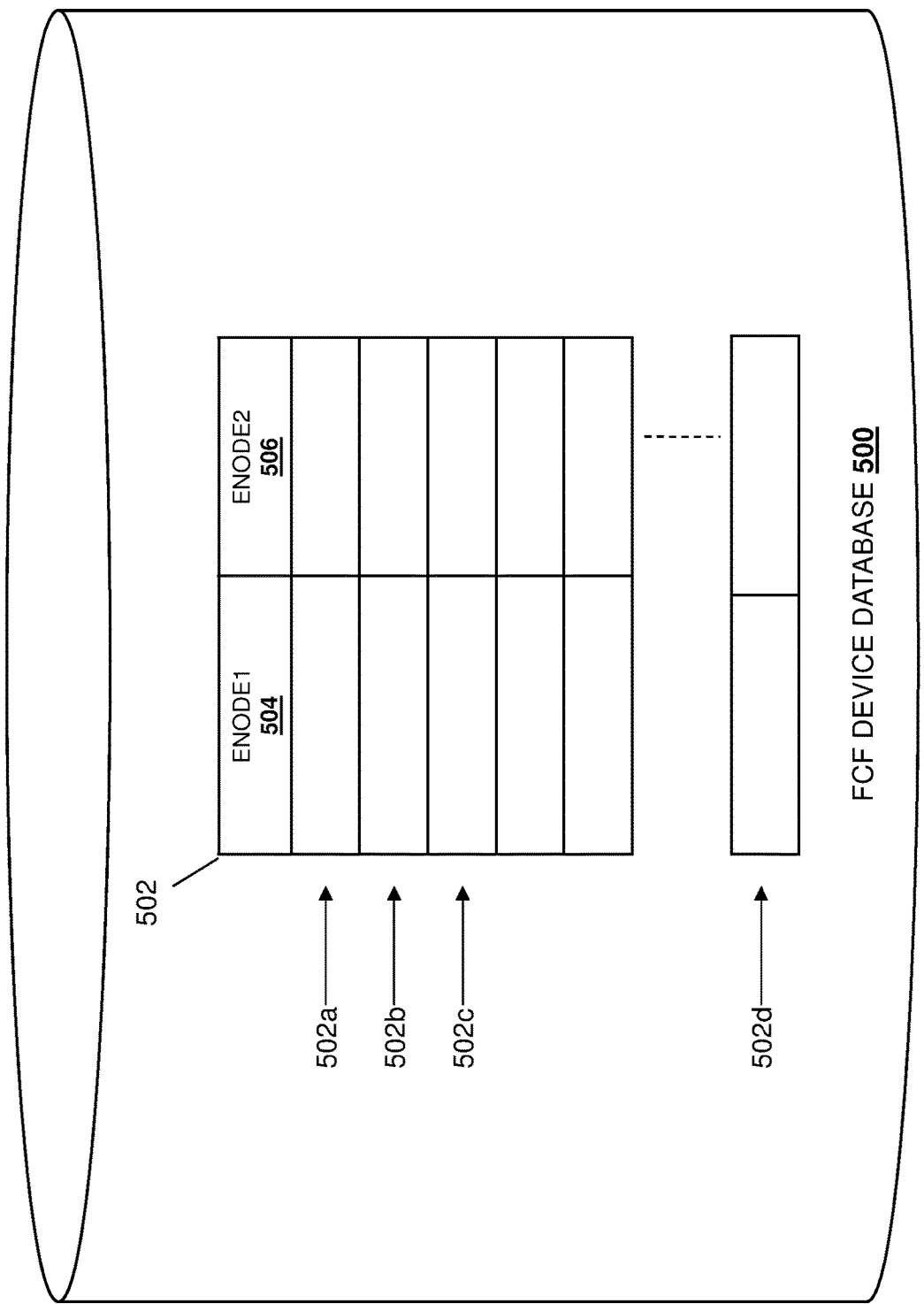
FIG. 5 is a schematic view illustrating an embodiment of an FCF device database in the FCF device of FIG. 4.

Referring now to FIG. 5, an embodiment of an FCF device database 500 is illustrated. In an embodiment, the FCF device database 500 may be the FCF device database 406 discussed above with reference to FIG. 4. In the specific example illustrated in FIG. 5, the FCF device database 500 includes an FCF device enode association table 502 that may identify the devices that are connected to the FCF device 400 and that are permitted to communicate with each other based on zoning at the FC networking device 206, as discussed in further detail below. The FCF device enode association table 502 includes FCF device enode association table entries 502a, 502b, 502c, and up to 502d. For example, for each FCF device enode association table entry 502a-d, the FCF device enode association table 502 may include an enode device column 504 that is configured to include an enode identifier for an enode (e.g., one of the end devices 202a-202h), and an enode device column 506 that is configured to include an enode identifier for another enode device (e.g., one of the remaining end devices 202a-202h). For example, the enode identifiers in the same FCF device enode association table entry indicates that the end devices identified by the enode identifiers are allowed to communicate with each other. In an embodiment, the enode identifiers may be provided by Fibre Channel Identifiers (FCIDs). For example, an FCID (N_Port ID) may include a 24-bit value that the FC networking device 206 assigns to an N_Port or VN_Port on the end device as a unique identifier within a local FC network, and that FCID may include an 8-bit domain value, an 8-bit area value, and an 8-bit port value. However, one of skill in the art in possession of the present disclosure will recognize that other device identifiers for the end devices 202a-202h may be used alternatively to and/or in addition to the FCID.

Figure 6:
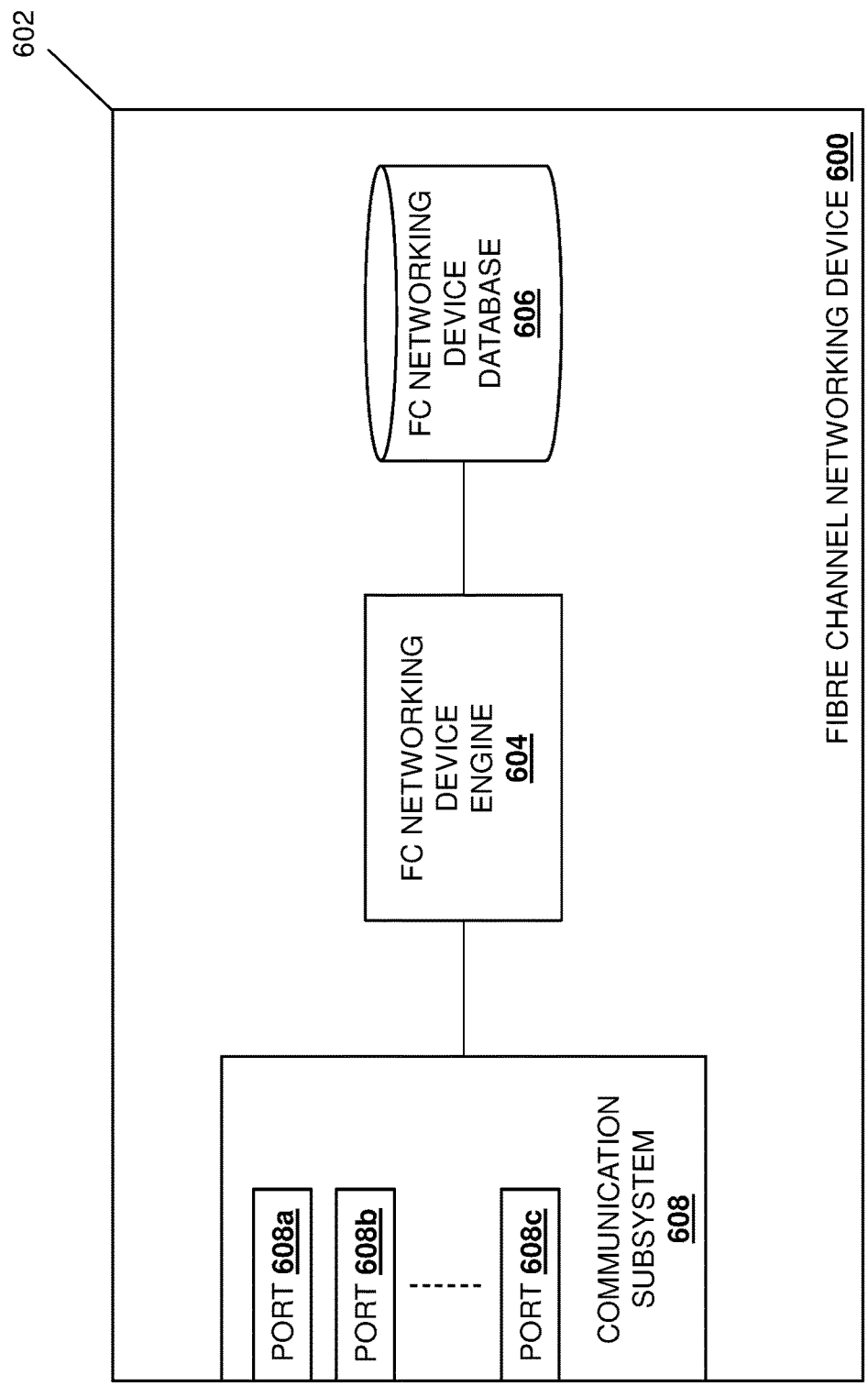
FIG. 6 is a schematic view illustrating an embodiment of a Fibre Channel (FC) networking device in the FCF device local routing system of FIG. 2.

Referring now to FIG. 6, an embodiment of a Fibre Channel (FC) networking device 600 is illustrated that may be the FC networking device 206 discussed above with reference to FIG. 2. As such, the FC networking device 600 may be provided by the IHS 100 discussed above with reference to FIG. 1 and/or may include some or all of the components of the IHS 100, and in specific examples may be an FC switch device. In the illustrated embodiment, the FC networking device 600 includes a chassis 602 that houses the components of the FC networking device 600, only some of which are illustrated in FIG. 6. For example, the chassis 602 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an FC networking device engine 604 that is configured to perform the functions of the FC networking device engines and FC networking devices discussed below. The chassis 602 may also house a storage system (not illustrated, but which may include the storage device 108 discussed above with reference to FIG. 1) that is coupled to the FC networking device engine 604 (e.g., via a coupling between the storage system and the processing system) and that may include an FC networking device database 606 that is configured to store the data utilized by the FC networking device engine 604 as discussed below.

The chassis 602 may also house a communication subsystem 608 that is coupled to the FC networking device engine 604 (e.g., via a coupling between the communication subsystem 608 and the processing system) and that may include a Network Interface Controller (NIC), a wireless communication device, a Fibre Channel interface, ports, and/or other communication components that would be apparent to one of skill in the art in possession of the present disclosure. For example, in the illustrated embodiment, the communication subsystem 608 includes a plurality of ports 608a, 608b, and up to 608c, each of which may be coupled to an FCF device as well as an FC SAN (e.g., the FC storage system 208) as discussed herein. While a specific FC networking device 600 has been described, one of skill in the art in possession of the present disclosure will recognize that the FC networking device 600 may include a variety of other components and/or component configurations that perform conventional FC networking device functionality, as well as the functionality described below, while remaining within the scope of the present disclosure.

Figure 7:
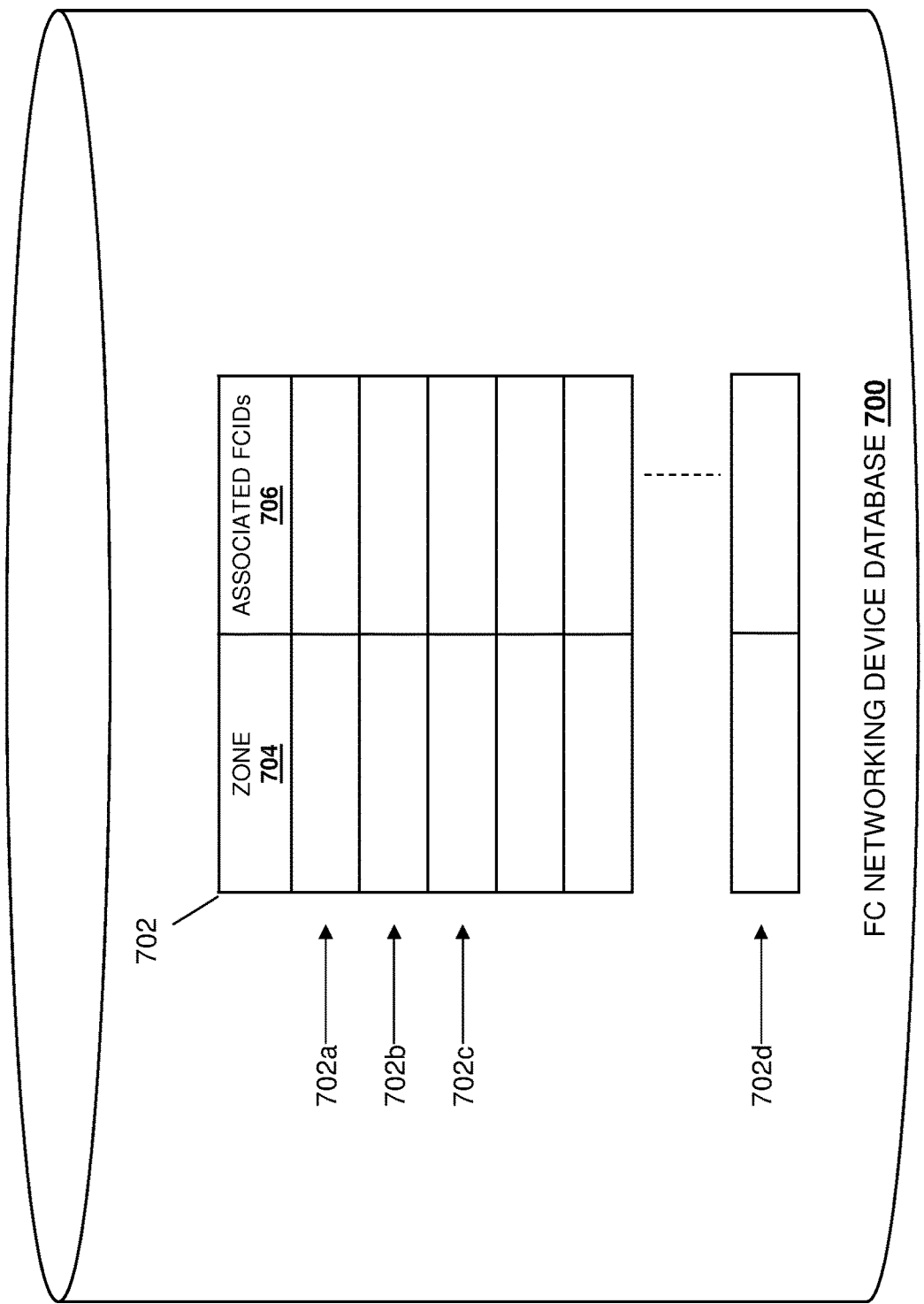
FIG. 7 is a schematic view illustrating an embodiment of an FC networking device database in the FC networking device of FIG. 6.

Referring now to FIG. 7, an embodiment of an FC networking device database 700 is illustrated. In an embodiment, the FC networking device database 700 may be the FC networking device database 606 discussed above with reference to FIG. 6. In the illustrated example, the FC networking device database 700 includes an active zone table 702 having active zone table entries 702a, 702b, 702c, and up to 702d. For example, for each active zone table entry 702a-702d, the active zone table 702 may include a zone column 704, an associated device identifier column 706, and/or other information columns that would be apparent to one of skill in the art in possession of the present disclosure. As discussed below, the active zone table 702 may provide mappings of a zone to device identifiers (e.g., FCIDs) that are associated with that zone, and device identifiers for end devices associated with a zone indicate which end devices can communicate with each other. While a specific example of the FC networking device database 700 is illustrated, one of skill in the art in possession of the present disclosure will recognize that the FC networking device database 700 and/or the active zone table 702 may include and/or store other information to enable the functionality discussed below while remaining within the scope of the present disclosure.

Figure 8:
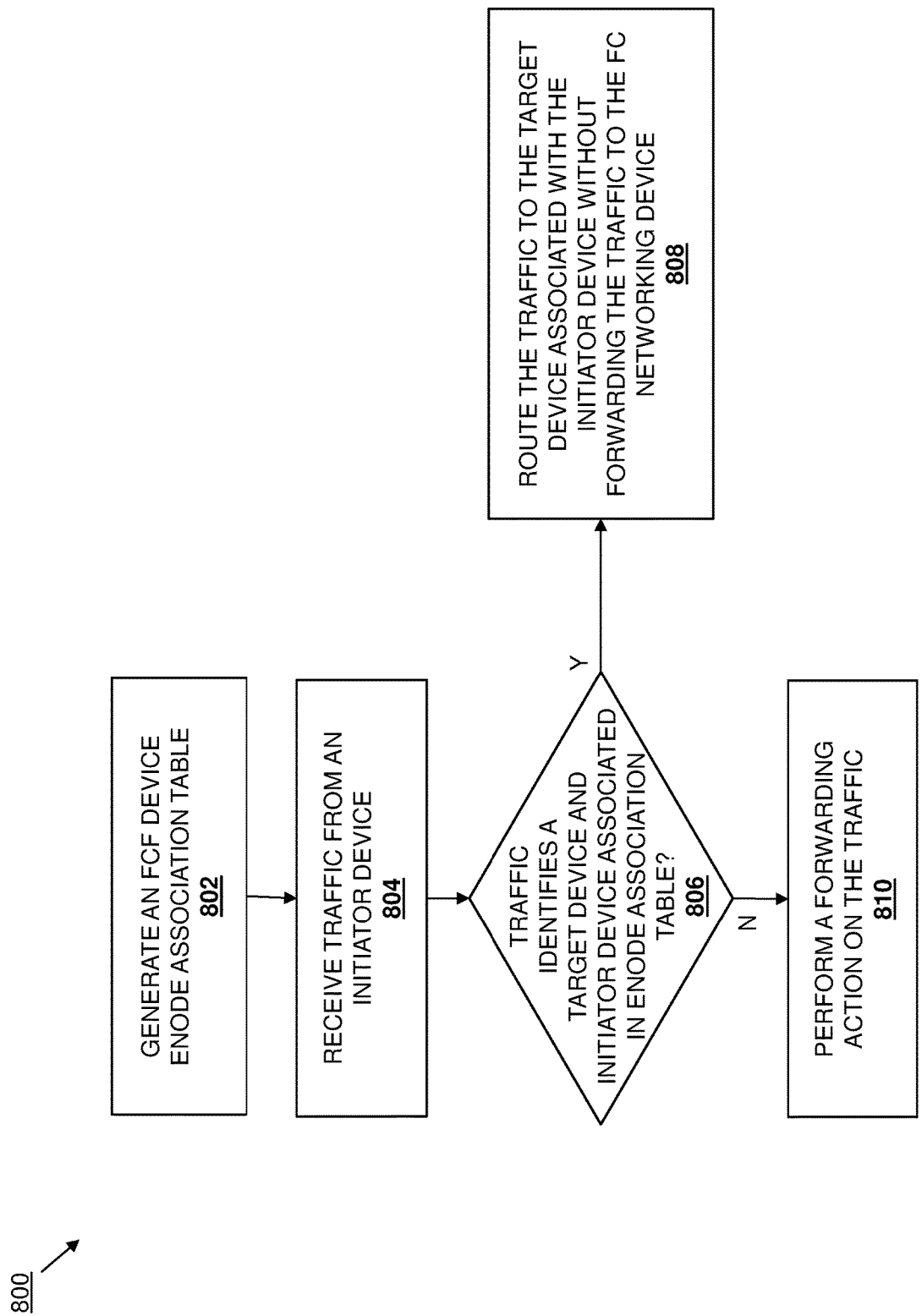
FIG. 8 is a flow chart illustrating an embodiment of a method for locally routing FCF traffic.

Referring now to FIG. 8, an embodiment of a method 800 for providing FCF device local routing is illustrated. As discussed above, conventional FCF devices forward all traffic received from end devices that are initiator devices to an FC switch device to allow the FC switch device to route the traffic from an initiator device to an end device that is a target device. However, forwarding all traffic to an FC switch device introduces a number of inefficiencies that may result in, for example, "traffic tromboning". For example, if the initiator device and the target device are both directly connected to the FCF device, traffic tromboning may occur when the traffic that is received at the FCF device from the initiator device is forwarded to the FC switch device, the FC switch device processes the traffic, and the FC switch device sends the traffic back to the FCF device for forwarding to the target device. The systems and methods of the present disclosure provide an FCF device that locally routes traffic that is received from an initiator device to a target device that is connected to the FCF device or a downstream FCF device without the traffic being provided to the FC switch device. Furthermore, the systems of the present disclosure may include downstream FCF devices that cascade from the FCF device connected to the FC switch device and that are not configured to locally route traffic received from initiator devices to target devices that are logged in to the FC fabric through that downstream FCF device, and the FCF device of the present disclosure that is connected to the FC switch device may provide local traffic routing (e.g., without the need to forward that traffic to the FC switch device) for those downstream FCF devices as well. Using the FCF devices to route the traffic reduces the load at the FC switch device, decreases latency of the traffic being sent, alleviates congestion on the link between the FC switch device and the FCF device, and provides other benefit that would be apparent to one of skill in the art in possession of the present disclosure.

The method 800 begins at block 802 where an FCF device enode association table is generated. In an embodiment of block 802 and with reference to a FCF device local routing system communication diagram 900 illustrated in FIG. 9, the embodiment of the FC networking device database 700 illustrated in FIG. 10A, an FCF device database 1000a illustrated in FIG. 10B, and an FCF device database 1000b illustrated in FIG. 10O, the routing engine 405 in the FCF device 400 may generate one or more enode association tables for locally routing traffic between initiator devices and target devices without that traffic being forwarded to the FC networking device 206. For example, and with reference to the FCF device local routing system communication diagram 900 illustrated in FIG. 9 and the FCF device local routing system 200 illustrated in FIG. 2, at step 902 the FCF device 204a may provide a Fabric Login (FLOGI) to the FC networking device 206 through a physical node port (PN_port) (e.g., port 408a). As would be appreciated by one of skill in the art in possession of the present disclosure, the common service parameters in a FLOGI may include one or more unused bits, and in some examples the routing engine 405 may be configured to enable an unused bit in the FLOGI that indicates to the FC networking device 206 that an FCF local routing feature (e.g., an optimal path selection feature) is enabled at the FCF device 204a. At step 904, the FC networking device 206 may respond to the FLOGI with a FLOGI accept (ACC) in order to complete the login of the FCF device 204a to the FC networking device 206.

At step 906, the FCF device 204a may provide an advertisement (e.g., a FCoE Initialization Protocol (FIP) discovery advertisement) to downstream FCF devices (e.g., the FCF devices 204b and/or 204c), end devices 202a-202c, and/or other enodes so that the end devices 202a-202c and/or the FCF device 204b and/or 204c may discover the presence of the FCF device 204a and provide login requests to log in to the FC fabric. As such, at step 908, the FCF device 204b may provide a FLOGI to the FCF device 204a in response to the advertisement. In the examples described herein, the FCF device 204b may be enabled to provide the FCF device local routing feature of the present disclosure that provides for the routing of traffic between initiator devices and target devices without forwarding the traffic toward the FC networking device 206 and, as such, the routing engine 405 in the FCF device 204b/400 may be configured to enable the unused bit of the FLOGI that indicates to the FC networking device 206 and/or the FCF device 204a that FCF local routing feature is enabled at the FCF device 204b. At step 910, the end devices 202a-202c that are coupled to the FCF device 204a may each provide a FLOGI in order to each log in to the FCF device 204a in response to the advertisement received at step 906. At step 912, the FCF device 204a may provide an FDISC to the FC networking device 206 for each of the FLOGIs received from the end devices 202a-202c and the FCF device 204b. The FC networking device 206 may then log in each of the end devices 202a-202c and the FCF device 204b, and provide an FDISC ACC to the FCF device 204a at step 914.

At step 916, the FCF device 204a may provide corresponding FLOGI ACCs to the FCF device 204b and the end devices 202a-202c.

In addition, at step 918 the FCF device 204c may provide a FLOGI to the FCF device 204a in response to the advertisement received at step 906. In the example below, the FCF device local routing feature provided by FCF device 204c may be disabled, or the FCF device 204c may be a conventional FCF device that is not configured with the FCF device local routing functionality of the present disclosure. As such, in the illustrated embodiment the routing engine 405 for the FCF device 204c does not enable the unused bit in the FLOGI that, as discussed above, may be utilized to indicate to the FC networking device 206 and/or the FCF device 204a that FCF local routing feature is enabled at the FCF device 204c. At step 920, the FCF device 204a may provide an FDISC to the FC networking device 206 for the FLOGI received from the FCF device 204c. The FC networking device 206 may then log in the FCF device 204c and, at step 922, provide an FDISC ACC to the FCF device 204a. in response, at step 924 the FCF device 204a may provide a FLOGI ACC to the FCF device 204c. While not illustrated, the end devices 202d-f may log in to the FC networking device 206 through the FCF device 204b and FCF device 204a, and the end devices 202g-202h may log in to the FC networking device 206 through the FCF device 204c and the FCF device 204a, using conventional FLOGIs and login techniques that would be apparent to one of skill in the art in possession of the present disclosure.

Following the logging in of enodes (e.g., the end devices 202a-202h and/or ports on the end devices 202a-202h) to the FC networking device 206, the FC networking device 206 may determine an enode association list for the end devices 202a-202h that are logged in through the FCF device 204a and that are included in the same zones using, for example, the active zone table 702 in the FC networking device database 700. At step 926, the FC networking device 206 may provide the enode association list to the FCF device 204a. In an embodiment, the FC networking device 206 may provide an Extended Link Service (ELS) message that includes the enode association list that identifies end devices that can communicate with each other. For example, the FC networking device 206 may provide the ELS message periodically as end devices log in to the FC networking device 206, or when all of the end devices 202a-202h and the FCF devices 204a-204c have logged in to the FC networking device 206. With reference to the active zone table entries 702a-702d in the active zone table 702 in the example of the FC networking device database 700 illustrated in FIG. 10A, the active zone table entry 702a identifies "Zone A" and "202a" and "202b" to indicate that the end device 202a and the end device 202b in Zone A are allowed to communicate with each other, which may have been provided as a first enode association in the enode association list generated by the FC networking device 206. Similarly, the active zone table entry 702b identifies "Zone B" and "202d" and "202c" to indicate that the end device 202d and the end device 202c in Zone B are allowed to communicate with each other, which may have been provided as a second enode association in the enode association list generated by the FC networking device 206; the active zone table entry 702c identifies "Zone C" and "202e" and "202f" to indicate that the end device 202e and the end device 202f in Zone C are allowed to communicate with each other, which may have been provided as a third enode association in the enode association list generated by the FC networking device 206; and the active zone table entry 702d identifies "Zone D" and "202g" and "202h" to indicate that the end device 202g and the end device 202h are allowed to communicate with each other, which may have been provided as a fourth enode association in the enode association list generated by the FC networking device 206.

The FCF device 204a may receive the ELS message including the enode association list and, in response, the FCF device 204a may provide an ELS ACC to the FC networking device 206 at step 928. The FCF device 204a may process the enode associations in the enode association list and generate an FCF device enode association table 502 based on the enode associations in the enode association list. In various embodiments, the FCF device 204a may create an FCF device enode association table entry for an enode association in the enode association list if end devices identified in an enode association are directly logged in to the FCF device 204a, or if end devices identified in an enode association are logged in to a downstream FCF device that is downstream from the FCF device 204a and that downstream FCF device either does not support the FCF device local routing feature of the present disclosure or the FCF device local routing feature in that downstream FCF device is disabled. If an enode association in the enode association list includes end devices that are all directly logged in to a downstream FCF device that is downstream from the FCF device 204a, and the FCF device 204a detected that the FCF device local routing feature is enabled in that downstream FCF device from the FLOGI provided from that downstream FCF device, then the FCF device 204a may generate a second enode association list that includes the enode associations for enodes that are directly logged in to that downstream FCF device, and provide that second enode association list downstream to the downstream FCF device.

Figure 9:
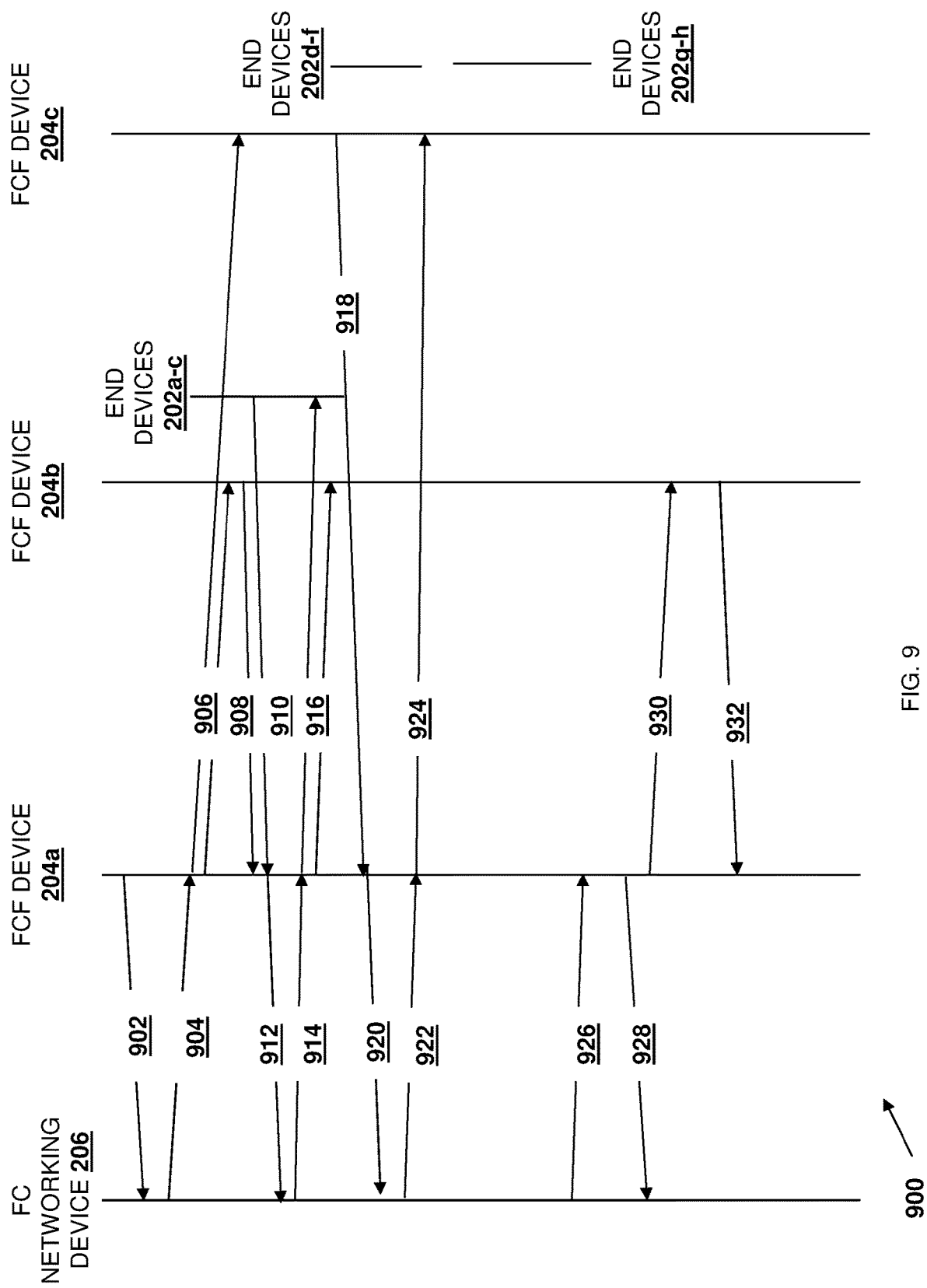
FIG. 9 is a communication diagram illustrating an embodiment of generating enode association tables that are used by FCF devices in the FCF device routing system of FIG. 2 in the method of FIG. 8.
Figure 10A:
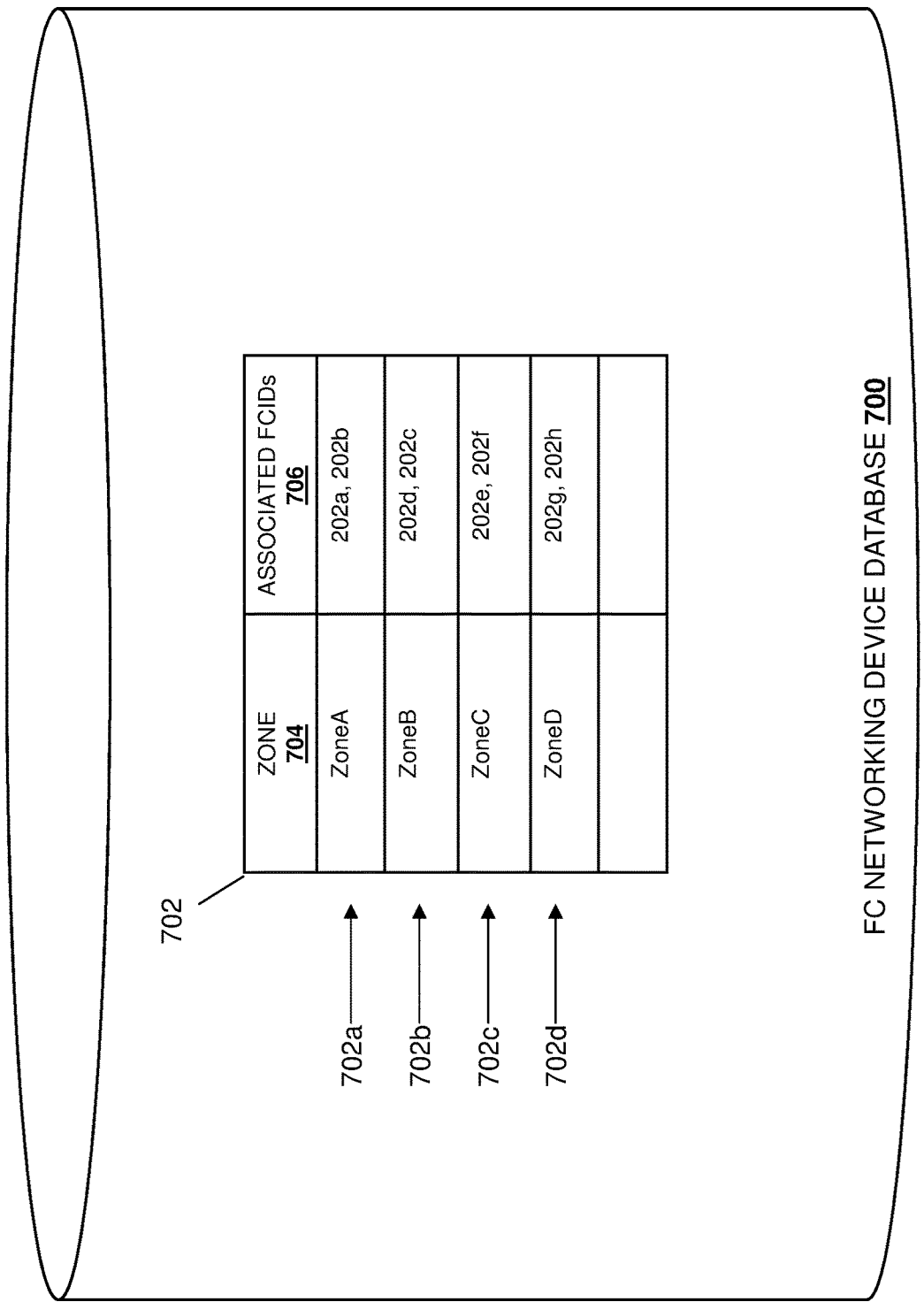
FIG. 10A is a schematic view illustrating an embodiment of information being provided in the FC networking device database of FIG. 7 of the FC networking device during the method of FIG. 8.
Figure 10B:
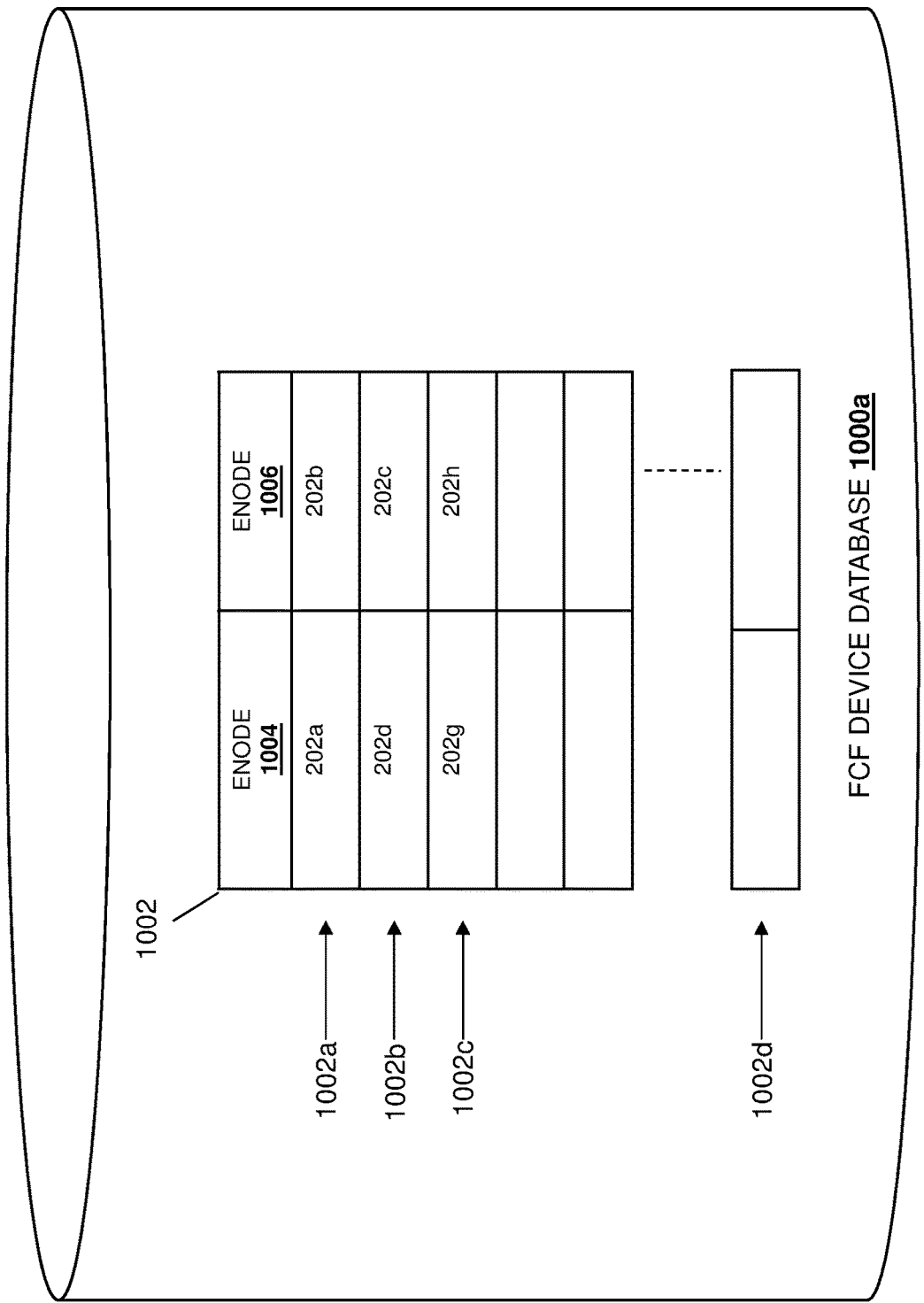
FIG. 10B is a schematic view illustrating an embodiment of information being provided in the FCF device database of FIG. 5 for a first FCF device during the method of FIG. 8.

For example, and with reference to the FCF device database 1000a illustrated in FIG. 10B (which may be the FCF device database 500 of FIG. 5), the routing engine 405 in the FCF device 204a has used a first enode association in the enode association list to create an FCF device enode association table entry 1002a that includes an enode identifier "202a" for the end device 202a in the enode column 1004, and an enode identifier "202b" for the end device 202b in the enode column 1006 (e.g., because both the end device 202a and the end device 202b are logged in to the FC fabric through the FCF device 204a). Similarly, the routing engine 405 for the FCF device 204a has used a second enode association in the enode association list to create an FCF device enode association table entry 1002b that includes an enode identifier "202d" for the end device 202d in the enode column 1004, and an enode identifier "202c" for the end device 202c in the enode column 1006 (e.g., because the end device 202c is logged in to the FCF device 204a). Similarly, the routing engine 405 for the FCF device 204a has used a fourth enode association in the enode association list to create an FCF device enode association table entry 1002c that includes an enode identifier "202g" for the end device 202g in the enode column 1004, and an enode identifier "202h" for the end device 202h in the enode column 1006 (e.g., because the FCF device 204a did not detect that the FCF device 204c is enabled for FCF device local routing via the FLOGI received from FCF device 204c at step 918 of FIG. 9).

However, when processing a third enode association that is included in the enode association list and that associates the end device 202e and the end device 202f, the routing engine 405 for the FCF device 204a may determine that the end device 202e and the end device 202f are logged in to the FC networking device 206 through the FCF device 204b, and that the FCF device 204b is enabled with the FCF device local routing feature (as identified in the FLOGI received at step 908 of FIG. 9). As such, the FCF device 204a may generate a second enode association list that includes the third enode association that associates the end device 202e and the end device 202f and, at step 930, provide the second enode association list to the FCF device 204b in an ELS message. The FCF device 204b may respond to the ELS message in step 930 with an ELS ACC in step 932. Furthermore, with reference to the example of the FCF device database 1000b illustrated in FIG. 10c (which may be the FCF device database 500 of FIG. 5), the routing engine 405 for the FCF device 204b has used the third enode association in the second enode association list to create an FCF device enode association table entry 1008a that includes an enode identifier "202e" for the end device 202e in the enode column 1010, and an enode identifier "202f" for the end device 202f in the enode column 1012 (e.g., because both the end device 202e and the end device 202f are logged in to the FC fabric through the FCF device 204b).

The method 800 then proceeds to block 804 where traffic is received from an initiator device at a FCF device port that is coupled to the initiator device. In an embodiment of block 804, the initiator device may be provided by any of the end devices 202a-202c that are directly connected to the FCF device 204a, and may provide traffic to that FCF device 204a that is addressed to a target device that may be provided by any of the devices in the FC SAN (e.g., end devices 202a-202h and the FC storage system 208). However, in other embodiments the initiator device may a device that is connected to the FCF device 204a through an intermediary device. For example, the initiator device may be any of the end devices 202d-202f that are directly connected to the FCF device 204b that is in turn directly connected to the FCF device 204a, or any of the end devices 202g-202h that are directly connected to the FCF device 204c that is in turn directly connected to the FCF device 204a. As such, the FCF device port at which the traffic is received may be an FCF device port on any of the FCF devices 204a-204c. In various embodiments, the traffic may include an initiator device identifier (e.g., an FCID of the initiator device) and a target device identifier (e.g., an FCID of the target device).

Figure 11A:
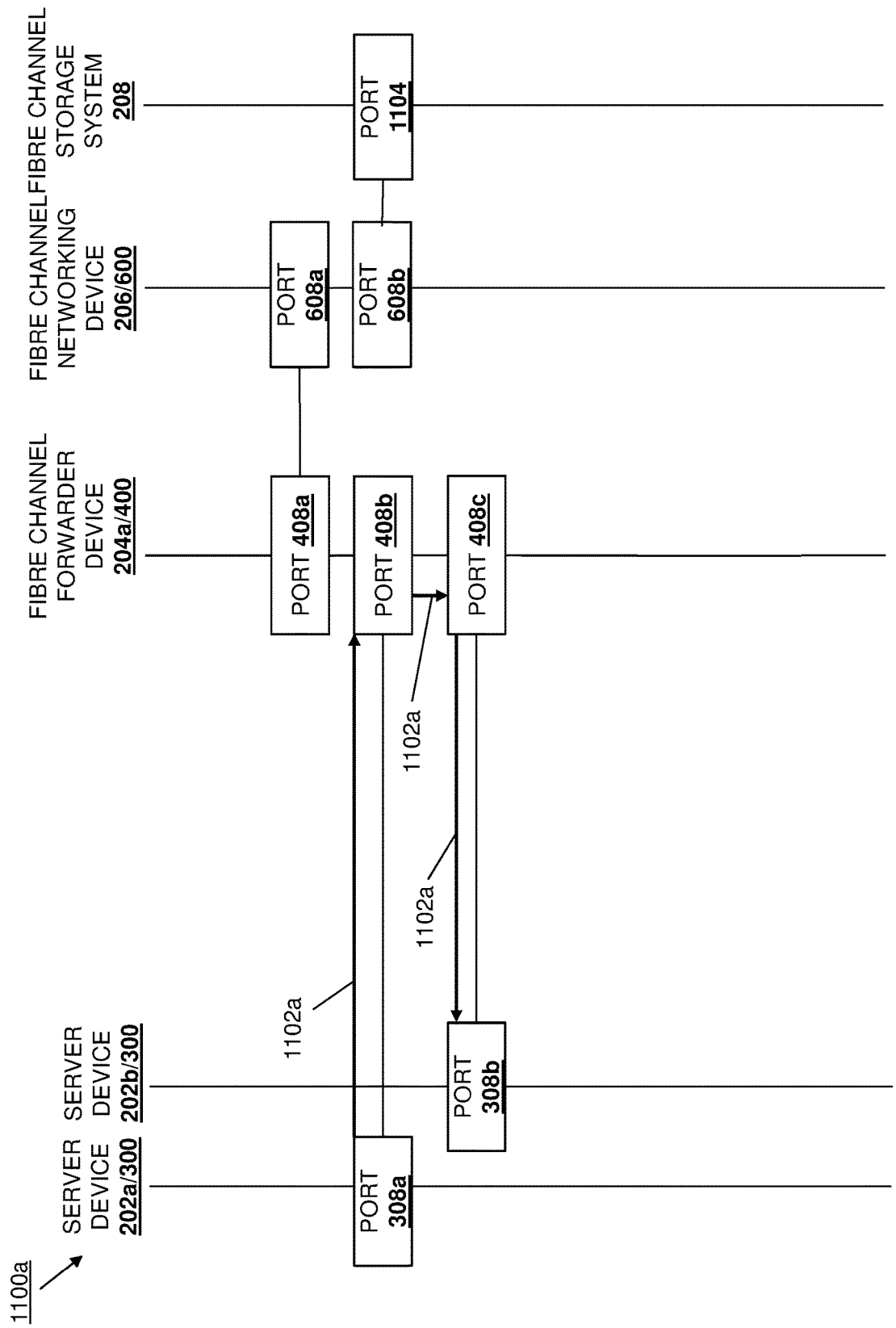
FIG. 11A is a diagram illustrating an embodiment of the FCF device local routing during the method of FIG. 8.

For example, and with reference to the FCF device local routing diagram 1100a illustrated in FIG. 11A, the initiator device may be the end device 202a, and the end device 202a may provide traffic to the FCF device 204a. As illustrated by a traffic route 1102a, the target device for the traffic provided by the end device 202a may be the end device 202b. In the example provided by the FCF device local routing diagram 1100b illustrated in FIG. 11B, the initiator device may be the end device 202d, and the end device 202d may provide traffic to the FCF device 204b. As illustrated by a traffic route 1102b, the target device for the traffic provided by the end device 202d may be the end device 202c. In the example provided by the FCF device local routing diagram 1100c illustrated in FIG. 11C, the initiator device may be the end device 202e, and the end device 202e may provide traffic to the FCF device 204b. As illustrated by a traffic route 1102c, the target device for the traffic provided by the end device 202e may be the end device 202f. In the example provided by the FCF routing diagram 1100d illustrated in FIG. 11D, the initiator device may be the end device 202g, and the end device 202g may provide traffic to the FCF device 204c. As illustrated by a traffic route 1102d, the target device for the traffic provided by the end device 202g may be the end device 202h.

The method 800 then proceeds to decision block 806 where it is determined whether the traffic identifies a target device and an initiator device that are associated in the FCF device enode association table. In an embodiment of decision block 806 and with reference to the FCF device database 1000a illustrated in FIG. 10B, if the FCF device 204a receives the traffic, the routing engine 405 for the FCF device 204a may use the FCF device enode association table 1002 to determine whether the traffic being received at an F_Port (e.g., any of the ports 408b-408e) on the FCF device 204a includes an enode identifier for the initiator device and an enode identifier for the target device associated in an FCF device enode association table entry in the FCF device enode association table 1002. For example, the routing engine 405 may determine whether the traffic includes both an enode identifier of "202a" (e.g., an FCID of the end device 202a) and an enode identifier "202b" (e.g., an FCID of the end device 202b); both an enode identifier of "202d" (e.g., an FCID of the end device 202d) and an enode identifier "202c" (e.g., an FCID of the end device 202c); or both an enode identifier of "202g" (e.g., an FCID of the end device 202g) and an enode identifier "202h" (e.g., an FCID of the end device 202h).

In another embodiment of decision block 806 and with reference to the FCF device database 1000b of FIG. 10O, if the FCF device 204b receives the traffic, the routing engine 405 of the FCF device 204b may use the FCF device enode association table 1008 to determine whether the traffic being received at an F_Port (e.g., any of the ports 408b-408e) on the FCF device 204b includes an enode identifier for the initiator device and an enode identifier for the target device that are associated in an FCF device enode association table entry in the FCF device enode association table 1008. For example, the routing engine 405 may determine whether the traffic includes both an enode identifier of "202e" (e.g., an FCID of the end device 202e) and an enode identifier "202f" (e.g., an FCID of the end device 202f).

If, at decision block 806, it is determined that the enode identifier for the initiator device and the enode identifier for the target device identifier included in the traffic corresponds with the same enode identifier for the initiator device and the same enode identifier for the target device associated in an FCF device enode association table entry in the FCF device enode association table, then the method 800 proceeds to block 808 where the traffic is routed to the target device associated with the target device identifier without forwarding the traffic upstream to the FC networking device. In an embodiment of block 808, the routing engine 405 may route the traffic received at an F_Port on the FCF device that is connected to the initiator device identified in the traffic, to an F_Port on the FCF device that is directly or indirectly connected to the target device. Thus, the routing engine 405 may provide the traffic to the target device without the traffic first being forwarded toward the FC networking device 206, as is performed by conventional FCF devices.

If, at decision block 806, it is determined that the enode identifier for the initiator device and the enode identifier for the target device identifier included in the traffic are not associated in an FCF device enode association table entry provided in the FCF device enode association table, then the method 800 proceeds to block 810 where a forwarding action is performed on the traffic. In an embodiment of block 810, the routing engine 405 may perform a forwarding action on the traffic in response to determining that the enode identifier for the initiator device and the enode identifier for the target device identifier that are included in the traffic are not associated in any FCF device enode association table entries provided in the FCF device enode association table 502 in the FCF device database 500. In various embodiments, the forwarding action may include the routing engine 405 forwarding the traffic to the FC networking device 206 or another upstream FCF device. For example, the FCF device 204a may forward traffic to the FC networking device 206, while the FCF device 204b and the FCF device 204c may forward the traffic to the FCF device 204a.

Referring now to FIGS. 11A, 11B, 11C, and 11D, the FCF device local routing diagrams 1100a, 1100b, 1100c, and 1100d, respectively, illustrate various scenarios that provide FCF device local routing in the FCF device local routing system 200 according to blocks 804-810 of the method 800. For example and with reference to the FCF device database 1000a illustrated in FIG. 10B and the FCF device local routing diagram 1100a illustrated in FIG. 11A, the FCF device 204a may receive traffic at port 408b from port 308a of the end device 202a, and determine that the enode identifier "202a" for the end device 202a and the enode identifier "202b" for the end device 202b that are included in the traffic correspond to (e.g., are associated in) the FCF device enode association table entry 1002a that is provided in the FCF device enode association table 1002. The routing engine 405 may then route the traffic to the port 408c on the FCF device 204a, and provide that traffic to the port 308b of the end device 202b, which may be assigned the enode identifier (e.g., an FCID assigned by the FC networking device to port 308b) included in the traffic. Thus, the FCF device 204a does not forward the traffic through the port 408a to the port 608a on the FC networking device 206 for routing back through the FCF device 204a, as would be performed in conventional FCF devices and FCF routing systems.

Figure 11B:
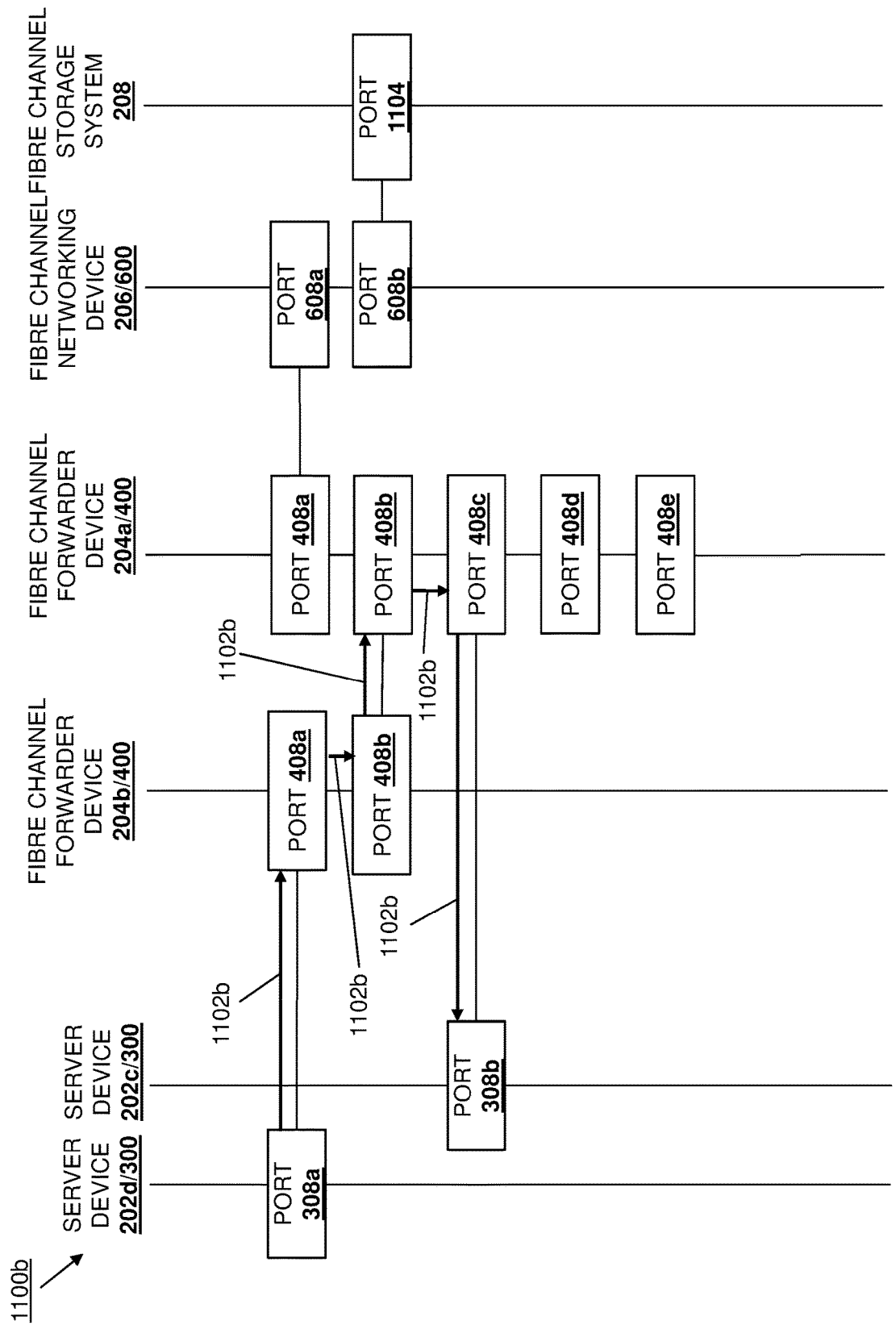
FIG. 11B is a diagram illustrating an embodiment of the FCF device local routing during the method of FIG. 8.

In another example and with reference to the FCF device database 1000a illustrated in FIG. 10B, the FCF device database 1000b illustrated in FIG. 10O, and the FCF device local routing diagram 1100b illustrated in FIG. 11B, the FCF device 204b may receive traffic at port 408a from port 308a on the end device 202d, and determine that the enode identifier "202d" for the end device 202a and the enode identifier "202c" for the end device 202c included in the traffic are not associated in any FCF device enode association table entry provided in the FCF device enode association table 1008 in the FCF device 204b. As such, the FCF device 204b may perform conventional traffic routing by providing the traffic upstream toward the FC networking device 206 through the port 408b on the FCF device 204b, which is received by the port 408b on the FCF device 204a. The FCF device 204a may determine that the enode identifier "202d" for the end device 202a and the target device identifier "202c" for the end device 202c included in the traffic correspond to (e.g., are associated in) the FCF device enode association table entry 1002b that is provided in the FCF device enode association table 1002 in the FCF device 204a. The routing engine 405 for the FCF device 204a may then route the traffic to the port 408c on the FCF device 204a, and provide that traffic to the port 308b on the end device 202c, which may be assigned the enode identifier (e.g., an FCID assigned by the FC networking device to port 308b on the end device 202c) included in the traffic. Thus, the FCF device 204a does not forward the traffic through the port 408a to the port 608a on the FC networking device 206 for routing back through the FCF device 204a, as would be performed in conventional FCF devices and FCF routing systems.

In yet another example and with reference to the FCF device database 1000b illustrated in FIG. 10O and the FCF device local routing diagram 1100c illustrated in FIG. 11C, the FCF device 204b may receive traffic at the port 408a from the port 308a on the end device 202e, and determine that the enode identifier "202e" for the end device 202e and the enode identifier "202f" for the end device 202f included in the traffic correspond to (e.g., are associated in) the FCF device enode association table entry 1008a that is provided in the FCF device enode association table 1008. The routing engine 405 may then route the traffic to the port 408b on the FCF device 204b, and provide that traffic to the port 308b on the end device 202f, which may be assigned the target device identifier (e.g., an FCID assigned by the FC networking device to port 308b) included in the traffic. Thus, the FCF device 204b does not forward the traffic through its port 408c to the port 408c on the FCF device 204a for forwarding via the port 408a on the FCF device 204a to the port 608a on the FC networking device 206, such that the FC networking device 206 routes the traffic back through the FCF device 204a and the FCF device 204b to the port 308b on the end device 202f, as would be performed in conventional FCF devices and FCF routing systems.

In another example and with reference to the FCF device database 1000a illustrated FIG. 10B and the FCF routing diagram 1100d illustrated in FIG. 11D, the FCF device 204c may receive traffic at the port 408a from the port 308a on the end device 202g. Because the FCF device 204c is a conventional FCF device (or the FCF device local routing feature is not enabled in the FCF device 204c) there is no enode association table in the FCF device database 406 in the FCF device 204c, and thus no determination is made that the enode identifier "202g" for the end device 202g and the enode identifier "202h" for the end device 202h included in the traffic correspond to (as associated in) an FCF device enode association table entry. As such, the FCF device 204c may perform conventional traffic routing by providing the traffic upstream toward the FC networking device 206 via the port 408b on the FCF device 204b, which is received by the port 408b on the FCF device 204a. The FCF device 204a may then determine that the enode identifier "202g" for the end device 202g and the enode identifier "202h" for the end device 202h included in the traffic correspond to (e.g., are associated in) the FCF device enode association table entry 1002c that is provided in the FCF device enode association table 1002 in the FCF device 204a. The routing engine 405 for the FCF device 204a may then route the traffic to the port 408b on the FCF device 204a, and provide that traffic to the port 408b on the FCF device 204d. The FCF device 204c may then forward the traffic through the port 408c on the FCF device 204c to the port 308b on the end device 202h, which may be assigned the enode identifier (e.g., an FCID assigned by the FC networking device to the port 308b on the end device 202h) included in the traffic. Thus, while "traffic tromboning" occurs between the port 408b on FCF device 204c and the port 408b on the FCF device 204a, the FCF device 204a does not forward the traffic through its port 408a to the port 608a on the FC networking device 206 for routing back through the FCF device 204a as would be performed in conventional FCF devices and FCF routing systems, which relieves congestion at the link between the port 408a on the FCF device 204a and the port 608a on the FC networking device 206, as well as decreases latency as the traffic is not forwarded completely upstream before being routed to the target device.

In an embodiment, if the enode identifier for the initiator device or the enode identifier for the target device identifier included in the traffic is not associated with any FCF device enode association table entry in any enode association table, or the target device is a device connected to the FC networking device 206 (e.g., the FC storage system 208) The routing engine 405 for the FCF device 204a may forward the traffic to the port 408a on the FCF device 204a, and provide that traffic to the port 608a on the FC networking device 206 for routing (or dropping) the traffic according to conventional techniques. For example, the FC networking device engine 604 may route the traffic to a port 1104 on the FC storage system 208, may drop the traffic if the initiator device and the target device cannot communicate with each other according to the active zone table 702, or may route the traffic back to the FCF device 204a for further routing if the target device identified in the traffic is downstream from the FC networking device 206 but not associated with an initiator device in an enode association table.

Thus, systems and methods have been described that provide for local routing of FCF device traffic by an FCF device that receives traffic addressed to a device directly connected to that FCF device such that that traffic is not forwarded to an FC networking device for routing. If the FCF device cannot locally route the traffic, the FCF device may forward the traffic toward the FCF networking device, and an intermediary FCF device may be able to locally route the traffic without providing the traffic to the FC networking device. Each FCF device in a cascade from FCF devices may reference FCF device enode associations tables that identify associations of initiator devices and target devices that are allowed to communicate with each other according to zoning provided by the FC networking device. As such, the systems and methods eliminate traffic tromboning between an FCF device and FC networking device, which occurs in conventional FC SANs. Thus, the systems and methods of the present disclosure reduce traffic latency, free up bandwidth on the links between the FCF device and the FC networking device as well as links between FCF devices, relieve congestion on those links, and reduce processing loads on the FCF device and the FC networking device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel Forwarder (FCF) routing system, comprising:
   a Fibre Channel (FC) networking device;
   a first initiator device;
   a first target device; and
   a first FCF device that is coupled to:
      the FC networking device through a first FCF device port on the first FCF device;
      the first initiator device through a second FCF device port on the first FCF device; and
      the first target device through a third FCF device port on the first FCF device, wherein the first FCF device is configured to:
         provide, through the first FCF device port to the FC networking device, a first fabric login (FLOGI) for the first FCF device that includes an indicator that an FCF device local routing feature is enabled at the first FCF device:
         receive, at the first FCF device port, an enode association list, wherein the enode association list is provided by the FC networking device to the first FCF device port in response to receiving the first FLOGI with the indicator, wherein the enode association list includes associations of initiator devices and target devices that are loqged in to the FC networking device through the first FCF device, and wherein the associations of the initiator devices and the target devices are based on zones provided by the FC networking device:

generate a first FCF device association table that includes the associations of initiator devices and target devices provided in the enode association list:

receive, at the second FCF device port, first traffic that originates from the first initiator device and that is addressed to the first target device;

determine, using the first FCF device association table that identifies the zones provided by the FC networking device, that the first target device is associated with the first initiator device; and route, in response to determining the first target device is associated with the first initiator device, the first traffic through the third FCF device port to the first target device without forwarding the first traffic through the first FCF device port to the FC networking device.

2. The FCF routing system of claim 1, further comprising:
a second initiator device;
a second target device; and
a second FCF device that is coupled to:
  the FC networking device via a fourth FCF device port on the first FCF device and a fifth FCF device port on the second FCF device;
  the second initiator device through a sixth FCF device port on the second FCF device; and
  the second target device through a seventh FCF device port on the second FCF device, wherein the first FCF device is configured to:
    receive, at the fourth FCF port from the second FCF device, second traffic that originates from the second initiator device and that is addressed to the first target device;
    determine, using the first FCF device association table, that the first target device is associated with the second initiator device; and
    route, in response to determining the first target device is associated with the second initiator device, the second traffic through the third FCF device port to the first target device without forwarding the second traffic through the first FCF device port to the FC networking device.

3. The FCF routing system of claim 2, wherein the first FCF device is configured to:
  receive, at the fourth FCF device port from the second FCF device, third traffic that originates from the second initiator device and that is addressed to the second target device;
  determine, using the first FCF device association table, that the second target device identified in the third traffic is associated with the second initiator device; and
  route, in response to determining the second target device is associated with the second initiator device, the third traffic through the fourth FCF device port to the fifth FCF device port on the second FCF device, wherein the third traffic is forwarded to the second target device through the seventh FCF device port by the second FCF device without forwarding the third traffic through the first FCF device port to the FC networking device.

4. The FCF routing system of claim 3, wherein the second FCF device does not include an FCF device association table.

5. The FCF routing system of claim 2, wherein the second FCF device is configured to:
  receive, at the sixth FCF device port, third traffic that originates from the second initiator device and that is addressed to the second target device;
  determine, using a second FCF device association table that is based on the zones provided by the FC networking device, that there is an association between the second initiator device and the second target device; and
  route, in response to determining the second target device is associated with the second initiator device, the third traffic through the seventh FCF device port to the second target device without forwarding the third traffic to the first FCF device via the fifth FCF device port on the second FCF device and the fourth FCF device port on the first FCF device.

6. The FCF routing system of claim 2, herein the first FCF device is configured to:
  provide, through the first FCF device port to the FC networking device, a first fabric login (FLOGI) that includes a local routing instruction;
  receive, at the first FCF device port, a first enode association list, wherein the first enode association list is generated by the FC networking device in response to receiving the first FLOGI with the local routing instruction, and wherein the first enode device association list includes associations of initiator devices and target devices that are logged in to the FC networking device through the first FCF device, and wherein the associations of the initiator devices and the target devices are based on the zones provided by the FC networking device;
  generate the first FCF device association table that includes the associations of initiator devices and target devices provided in the first enode association list;
  receive, at the fourth FCF device port from the second FCF device, a second FLOGI that includes the local routing instruction;
  generate, in response to receiving the second FLOGI with the local routing instruction, a second enode association list that is based on the first enode association list, wherein the second enode association list associates initiator devices and target devices that are logged in to the FC networking device through the second FCF device; and
  provide, through the fourth FCF device port to the fifth FCF device port on the second FCF device, the second enode association list that causes the second FCF device to generate a second FCF device association table.

7. The FCF routing system of claim 1, further comprising:
a second initiator device;
a second target device; and
a second FCF device that is located between the FC networking device and the first FCF device such that the second FCF device is coupled to:
  the first FCF device port on the first FCF device via a fourth FCF device port on the second FCF device:
  the FC networking device via a fifth FCF device port on the second FCF device;

the second initiator device through a sixth FCF device port on the second FCF device; and
the second target device through a seventh FCF device port on the second FCF device, wherein the first FCF device is configured to:
receive, at the second FCF device port, second traffic that originates from the first initiator device and that is addressed to the second target device;
determine, using the first FCF device association table that identifies predefined zones provided by the FC networking device, that there is no association between the first initiator device and the second target device; and
forward, in response to determining the second target device is not associated with the first initiator device, the second traffic through the first FCF device port to the fourth FCF device port on the second FCF device toward the FC networking device.

8. An Information Handling System (IHS), comprising:
a plurality of ports;
a processing system that is coupled to the plurality of ports; and
a memory system that is coupled to the processing system and that includes instructions that, when executed by the processing system, cause the processing system to provide an N_Port ID Virtualization (NPIV) Proxy Gateway (NPG) engine that is configured to:
provide, through a first port of the plurality of ports to a Fibre Channel (FC) networking device, a first fabric login (FLOGI) for the first port that includes a local routing instruction that indicates that the NPG engine is enabled for local routing:
receive, at the first port, a first enode association list,
wherein the first enode association list is provided by the FC networking device to the first port in response to receiving the first FLOGI with the local routing instruction,
wherein the first enode association list includes associations of initiator devices and target devices that are loqged in to the FC networking device through one or more of the plurality of ports, and
wherein the associations of the initiator devices and the target devices are based on the zones provided by the FC networking device;
generate a first Fibre Channel Forwarder (FCF) device association table that includes the associations of initiator devices and target devices provided in the first enode association list;
receive, at a second ort of the plurality of ports, first traffic that originates from a first initiator device and that is addressed to a first target device;
determine, using the first FCF device association table that identifies zones provided by the FC networking device, that the first target device is associated with the first initiator device; and
route, in response to determining the first target device is associated with the first initiator device, the first traffic through a third port of the plurality of ports to the first target device without forwarding the first traffic through the first port to the FC networking device.

9. The IHS of claim 8, wherein the NPG engine is configured to:
receive, at a fourth port of the plurality of ports from an FCF device, a second FLOGI that includes the local routing instruction;
generate, in response to receiving the second FLOGI with the local routing instruction, a second enode association list that is based on the first enode association list, wherein the second enode association list associates initiator devices and target devices that are logged in to the FC networking device through the FCF device; and
provide, through the fourth port to the FCF device, the second enode association list that cause the FCF device to generate a second FCF device association table.

10. The IHS of claim 8, wherein the NPG engine is configured to:
receive, at a fourth port of the plurality of ports from FCF device, second traffic that originates from a second initiator device and that is addressed to the first target device;
determine, using the first FCF device association table, that the first target device is associated with the second initiator device; and
route, in response to determining the first target device is associated with the second initiator device, the second traffic through the third port to the first target device without forwarding the second traffic through the third port to the FC networking device.

11. The IHS of claim 8, wherein the NPG engine is configured to:
receive, at a fourth port from an FCF device, second traffic that originates from a second initiator device and that is addressed to a second target device that is coupled to an FCF device;
determine, using the first FCF device association table, that the second target device identified in the second traffic is associated with the second initiator device; and
route, in response to determining the second target device is associated with the second initiator device, the second traffic through the fourth port to the FCF device, wherein the second traffic is forwarded to the second target device by the FCF device without forwarding the second traffic through the first port to the FC networking device.

12. The IHS of claim 8, wherein the NPG engine is configured to:
receive, at the second port, second traffic that originates from the first initiator device and that is addressed to a second target device;
determine, using the first FCF device association table, that there is no association between the first initiator device and the second target device; and
forward, in response to determining the second target device is not associated with the first initiator device, the second traffic through the first port toward the FC networking device.

13. A method of Fibre Channel Forwarder (FCF) device local routing, comprising:
providing, by a first Fibre Channel Forwarder (FCF) device through a first FCF device port on the first FCF device to a Fibre Channel (FC) networking device, a first fabric login (FLOGI) for the first FCF device that includes a local routing instruction that indicates that the first FCF device is enabled for local routing:
receiving, by the first FCF device at the first FCF device port, a first enode association list,
wherein the first enode association list is generated by the FC networking device in response to receiving the first FLOGI with the local routing instruction, wherein the first enode association list includes associations of initiator devices and target devices that are logged in to the FC networking device through the first FCF device, and wherein the associations of the initiator devices and the target devices are based on the zones provided by the FC networking device;

generating, by the first FCF device, a first FCF device association table that includes the associations of initiator devices and target devices provided in the first enode association list;

receiving, by the first FCF device, first traffic that originates from a first initiator device that is connected to a second FCF device port on the first FCF device, and that is addressed to a first target device that is connected to a third FCF device port on the first FCF device;

determining, by the first FCF device and using the first FCF device association table that identifies zones provided by the FC networking device, that the first target device is associated with the first initiator device; and routing, by the first FCF device in response to determining the first target device is associated with the first initiator device, the first traffic through the third FCF device port to the first target device without forwarding the first traffic through the first FCF device port to the FC networking device.

14. The method of claim 13, further comprising:

receiving, by the first FCF device at a fourth FCF device port from a second FCF device, a second FLOGI that includes the local routing instruction indicating that the second FCF device is enabled to perform local routing;

generating, by the first FCF device in response to receiving the second FLOGI with the local routing instruction, a second enode association list that is based on the first enode association list, wherein the second enode association list associates initiator devices and target devices that are logged in to the FC networking device through the second FCF device; and providing, by the first FCF device through the fourth FCF device port to the second FCF device, the second enode association list that causes the second FCF device to generate a second FCF device association table.

15. The method of claim 13, further comprising:

receiving, by the first FCF device at a fourth FCF device port from a second FCF device, second traffic that originates from a second initiator device and that is addressed to the first target device;

determining, by the first FCF device, using the first FCF device association table, that the first target device is associated with the second initiator device; and routing, by the first FCF device and in response to determining the first target device is associated with the second initiator device, the second traffic through the third FCF device port to the first target device without forwarding the second traffic through the first FCF device port to the FC networking device.

16. The method of claim 13, further comprising:

receiving, by the first FCF device at a fourth FCF device port from a second FCF device, second traffic that originates from a second initiator device and that is addressed to a second target device that is coupled to the second FCF device;

determining, by the first FCF device using the first FCF device association table, that the second target device identified in the second traffic is associated with the second initiator device; and routing, by the first FCF device and in response to determining the second target device is associated with the second initiator device, the second traffic through the fourth FCF device port to the second FCF device, wherein the second traffic is forwarded to the second target device by the second FCF device without forwarding the second traffic through the first FCF device port to the FC networking device.

17. The method of claim 13, further comprising:

receiving, by the first FCF device at the second FCF device port, second traffic that originates from the first initiator device and that is addressed to a second target device;

determine, by the first FCF device using the first FCF device association table, that there is no association between the first initiator device and the second target device; and forward, by the first FCF device and in response to determining the second target device is not associated with the first initiator device, the second traffic through the first FCF device port toward the FC networking device.

* * * * *